United States Patent
Abend et al.

(10) Patent No.: US 7,500,362 B2
(45) Date of Patent: Mar. 10, 2009

(54) AXLE DRIVING APPARATUS

(75) Inventors: Robert Abend, Adairsville, GA (US); Norihiro Ishii, Amagasaki (JP); Ryota Ohashi, Amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 28 days.

(21) Appl. No.: 11/681,310

(22) Filed: Mar. 2, 2007

(65) Prior Publication Data

US 2007/0144167 A1    Jun. 28, 2007

Related U.S. Application Data

(63) Continuation of application No. 11/676,529, filed on Feb. 20, 2007, which is a continuation of application No. 11/612,842, filed on Dec. 19, 2006, which is a continuation of application No. 11/463,696, filed on Aug. 10, 2006, which is a continuation of application No. 10/770,012, filed on Feb. 3, 2004, now Pat. No. 7,121,093, which is a continuation of application No. 10/406,267, filed on Apr. 4, 2003, now Pat. No. 6,705,080, which is a continuation of application No. 10/128,457, filed on Apr. 24, 2002, now Pat. No. 6,571,555, which is a continuation of application No. 09/737,567, filed on Dec. 18, 2000, now Pat. No. 6,550,242, which is a continuation of application No. 09/531,174, filed on Mar. 20, 2000, now Pat. No. 6,385,971, which is a continuation of application No. 09/051,032, filed as application No. PCT/US95/13854 on Oct. 27, 1995, now Pat. No. 6,125,630.

(51) Int. Cl.
    *F16D 31/02*    (2006.01)
(52) U.S. Cl. ...................................................... 60/484

(58) Field of Classification Search ................... 60/484, 60/486, 487
See application file for complete search history.

(56) References Cited

U.S. PATENT DOCUMENTS 2,417,613 A    3/1947    Radabaugh (Continued)

*Primary Examiner*—F. Daniel Lopez
(74) *Attorney, Agent, or Firm*—Sterne, Kessler, Goldstein & Fox P.L.L.C.

(57) ABSTRACT

An axle driving apparatus for being mounted on the body frame of a vehicle and for independently rotating drive wheel members. The axle driving apparatus includes a first axle driving unit (18L) having a housing (40) and a single axle (20L), the single axle (20L) defining a proximal end portion rotatably mounted in the housing (40) and a distal end portion extending outwardly from a first side of tile housing (40). An enlarged region is defined by the housing (40), with the enlarged region extending substantially perpendicular to the longitudinal axis of the single axle (20L). A hydraulic stepless speed change assembly (22) is disposed within the enlarged region. The speed change assembly (22) includes a hydraulic pump (52) having an input shaft (21) projecting from the enlarged region aid includes a hydraulic motor (55) including an output shaft (74) drivingly connected to the single axle (20L). The first axle driving unit (18L) is used in conjunction with a second axle driving unit (18R) which is adjacently disposed to the first axle driving unit (18L) on the body frame of the vehicle and which is of substantially similar construction. However, the second axle driving unit (18R) features a single axle (20R) which extends outwardly from a second, opposite side of the housing (40) such that the axles (20L, 20R) are oppositely disposed.

7 Claims, 30 Drawing Sheets

U.S. PATENT DOCUMENTS

| | | |
|---|---|---|
| 3,332,323 A | 7/1967 | Roeske |
| 3,969,876 A | 7/1976 | Turos |
| 4,756,208 A | 7/1988 | Hayashi et al. |
| 4,781,259 A | 11/1988 | Yamaoka et al. |
| 4,796,722 A | 1/1989 | Kumagai |
| 4,809,796 A | 3/1989 | Yamaoka et al. |
| 4,819,508 A | 4/1989 | Yamaoka et al. |
| 4,835,951 A | 6/1989 | Walker |
| 4,870,820 A | 10/1989 | Nemoto |
| 4,899,525 A | 2/1990 | Takei et al. |
| 4,903,454 A | 2/1990 | Louis et al. |
| 4,909,365 A | 3/1990 | Tillotson et al. |
| 4,914,907 A | 4/1990 | Okada |
| 4,922,787 A | 5/1990 | Fujisaki et al. |
| 4,932,209 A | 6/1990 | Okada et al. |
| 4,942,780 A | 7/1990 | Fujisaki et al. |
| 4,962,675 A | 10/1990 | Aoi et al. |
| 5,078,222 A | 1/1992 | Hauser et al. |
| 5,127,215 A | 7/1992 | Wenzel |
| 5,142,940 A | 9/1992 | Hasegawa |
| 5,335,496 A | 8/1994 | Azuma et al. |
| 5,339,631 A | 8/1994 | Ohashi |
| 5,392,670 A | 2/1995 | Hauser |
| 5,400,594 A | 3/1995 | Hayens |
| 5,440,951 A | 8/1995 | Okada et al. |
| 5,560,447 A | 10/1996 | Ishii et al. |
| 5,613,409 A | 3/1997 | Hauser |
| 5,626,204 A | 5/1997 | Johnson |
| 5,636,555 A | 6/1997 | Okada et al. |
| 5,755,098 A | 5/1998 | Irikura |
| 5,894,907 A | 4/1999 | Peter |
| 5,980,416 A | 11/1999 | Gafvert |
| 6,038,840 A | 3/2000 | Ishimori et al. |
| 6,105,463 A | 8/2000 | Sporrer |
| 6,125,630 A | 10/2000 | Abend et al. |
| 6,385,971 B1 | 5/2002 | Abend et al. |
| 6,390,227 B1 | 5/2002 | Abend et al. |
| 6,467,265 B1 | 10/2002 | Abend et al. |
| 6,550,242 B2 | 4/2003 | Abend et al. |
| 6,568,498 B2 | 5/2003 | Abend et al. |
| 6,571,555 B2 | 6/2003 | Abend et al. |
| 6,648,095 B2 | 11/2003 | Abend et al. |
| 6,705,080 B2 | 3/2004 | Abend et al. |
| 6,745,864 B2 | 6/2004 | Abend et al. |
| 6,752,236 B2 | 6/2004 | Abend et al. |
| 6,983,815 B2 | 1/2006 | Abend et al. |
| 7,121,093 B2 | 10/2006 | Abend et al. |
| 2006/0064958 A1 | 3/2006 | Abend et al. |

AXLE DRIVING APPARATUS

CROSS-REFERENCE TO RELATED APPLICATIONS

This application is a continuation of U.S. application Ser. No. 11/676,529, filed Feb. 20, 2007; which is a continuation of application Ser. No. 11/612,842, filed Dec. 19, 2006; which is a continuation of U.S. application Ser. No. 11/463,696, filed Aug. 10, 2006; which is a continuation of U.S. application Ser. No. 10/770,012, filed Feb. 3, 2004; which is a continuation of U.S. application Ser. No. 10/406,267, filed Apr. 4, 2003, now U.S. Pat. No. 6,705,080, issued Mar. 16, 2004; which is a continuation of U.S. application Ser. No. 10/128,457, filed Apr. 24, 2002, now U.S. Pat. No. 6,571,555, issued Jun. 3, 2003; which is a continuation of U.S. application Ser. No. 09/737,567, filed Dec. 18, 2000, now U.S. Pat. No. 6,550,242, issued Apr. 22, 2003; which is a continuation of U.S. application Ser. No. 09/531,174, filed Mar. 20, 2000, now U.S. Pat. No. 6,385,971, issued May 14, 2002; which is a continuation of U.S. application Ser. No. 09/051,032, filed Mar. 31, 1998, now U.S. Pat. No. 6,125,630, issued Oct. 3, 2000; which is a National Stage of GC Application No. PCT/US95/13854, filed Oct. 27, 1995. The disclosures of the above-referenced applications are incorporated herein in their entirety by reference thereto.

TECHNICAL FIELD

This invention relates to an axle driving apparatus for independently driving the wheels of a self-propelled vehicle. In this particular invention the axle driving apparatus includes axle driving units provided with hydraulic stepless transmissions which drive single axles and which are adjacently disposed on a vehicle to independently rotate the drive wheels of such vehicle.

BACKGROUND ART

Axle driving units incorporating hydraulic stepless transmissions have been used to drive the axles of self-propelled vehicles for many years. Generally Such units include a hydraulic pump driven by an input shaft and a hydraulic motor having an output shaft drivingly connected through a differential to a pair of oppositely disposed axles. An example of such a unit is disclosed in U.S. Pat. No. 4,914,907. However, certain self-propelled vehicles perform tasks which require tight turning capabilities and conventional hydraulic transmissions which drive a pair of axles through a differential gear assembly are not particularly suited for such purposes. Instead, vehicles have been provided with axles which are independently driven by separate axle drive units such that turns are accomplished by rotating drive wheels on opposite sides of the vehicle at different speeds and/or in different directions. Further, certain such axle driving units for independently driving single axle have incorporated hydraulic transmissions. However, such axle driving units have required housings which are of substantial height and substantial width in order to accommodate the hydraulic pump and motor and the other necessary components. Accordingly, vehicles have required large body frames in order to accommodate two such axle driving units in a side-by-side disposition, thus ruling out use of the units on many small vehicles. Further, even where a large body frame is provided, the center of gravity of the vehicle tends to be higher than is desirable for good roadability due to the height of the axle driving units and the need to dispose the prime mover of the vehicle in an elevated position to efficiently drive the units. For example, in U.S. Pat. No. 5,127,215 a dual hydrostatic drive walk-behind mower is disclosed, but it can be readily seen that the axle driving units of this mower require substantial vertical and lateral space such that a large body frame is required. It will also be noted that due to the height of the transmission housings, the engine must be disposed in an elevated position which results in the vehicle having an undesirably high center of gravity. Moreover, multiple driving belts are required to drive the input shafts of the axle driving units. (See also, U.S. Pat. Nos. 4,809,796 and 5,078,222). In U.S. Pat. No. 4,819,508, a transmission system for working vehicles is disclosed which partially solves the problem of an undesirable center of gravity by reorienting the engine such that the crank shall is horizontally disposed. However, the axle driving mechanism still occupies substantial vertical space on the body frame, making the center of gravity undesirably high. Further, reorientation of the engine complicates the drive belt systems for driving both the axle driving units and the mower blades.

Therefore, it is an object of the present invention to provide an axle driving apparatus for independently driving axles on opposite sides of a vehicle.

It is another object of the present invention to provide an axle driving apparatus which includes side-by-side axle drive units incorporating hydraulic transmissions which require limited vertical or lateral space such that the axle driving apparatus can be used by small self-propelled vehicles, and such that vehicles utilizing such axle driving apparatus define low centers of gravity for improved roadability.

Yet another object of the present invention is to provide an axle driving apparatus having input shafts and a drive belt system which facilitates drivingly connecting the apparatus to the prime mover of the vehicle.

Still another object of the present invention is to provide an axle driving apparatus which is inexpensive to manufacture and maintain.

SUMMARY OF THE INVENTION

The present invention provides an axle driving apparatus for independently driving a pair of drive wheels on a self-propelled vehicle. The apparatus of the present invention includes axle driving units which drive a single axle, and which are selectively configured as left or right side axle driving units such that a pair of such units can be adjacently disposed in a side-by-side orientation on the body frame of the vehicle to drivingly support oppositely disposed drive wheels. Each of the axle driving units includes a housing comprising an upper half housing and a lower half housing joined to each other through a peripheral joint or junction surface. The left axle driving unit includes a single axle which projects from the left side of the housing for supporting a drive wheel on the left side of the vehicle. The right driving unit includes a single axle which projects from the right side of its housing for supporting a drive wheel on the right side of the vehicle. Whereas the axles project from opposite sides in the left and right axle driving units, in the preferred embodiment the housing is provided with bearing supports to accommodate the mounting of either a left side projecting axle or a right side projecting axle. Accordingly, the housing can be alternatively used in the construction of a left side axle driving unit or a right side axle driving unit.

In each of the axle driving units, the housing defines an enlarged region which extends perpendicular to the longitudinal axis of the operatively associated axle such that the length of the housing is greater than its width, thereby facilitating the side-by-side mounting of two axle driving units.

This enlarged region accommodates the mounting of a hydraulic stepless transmission which communicates the driving force of the prime mover, or engine, of the vehicle on which the apparatus is mounted to the operatively associated axle. The transmission includes a center section which defines a pump mounting surface on which a hydraulic pump is mounted and defines a motor mounting surface on which a hydraulic motor is mounted. The center section establishes closed circuit fluid communication between the hydraulic pump and motor and is configured to advantageously dispose the pump and motor in positions displaced from the single axle such that both the height and the width of the axle driving unit is reduced. Accordingly, the axle driving units can be mounted in a lower position on the vehicle to produce a lower center of gravity and can be accommodated in a relatively narrow body frame.

The hydraulic pump includes an input shaft which projects from the housing and which is drivingly connected by a driving belt to the prime mover of the vehicle. The hydraulic motor includes an input or motor shaft drivingly connected with the operatively associated single axle. The input shaft of each of the adjacent axle driving units carries an input pulley and a single driving belt is received around the input pulleys and a drive pulley mounted on the crank shaft of the prime mover to effect rotation of the input shafts. Further, the reduced height of the axle driving units permits the input pulleys and the drive pulley to be oriented in a triangular disposition and to be aligned on a common, substantially horizontal plane. Further, it allows the prime mover to be mounted in a low position on the body frame such that the vehicle defines a low center of gravity.

BRIEF DESCRIPTION OF THE DRAWINGS

The above mentioned features of the invention will be more clearly understood from the following detailed description of the invention read together with the drawings in which.

BEST MODE FOR CARRYING OUT THE INVENTION

The axle driving apparatus of the present invention is designed for independently driving a pair of drive wheels on self-propelled vehicles such as walk behind mowers, snow blowers, floor cleaning machines, riding lawn mowers, zero turn radius vehicles, and the like. Accordingly, although the axle driving apparatus is discussed below with respect driving the drive wheels of a self-propelled walk behind mower, it will be understood that such apparatus can be used with various vehicles.

Figure 1:
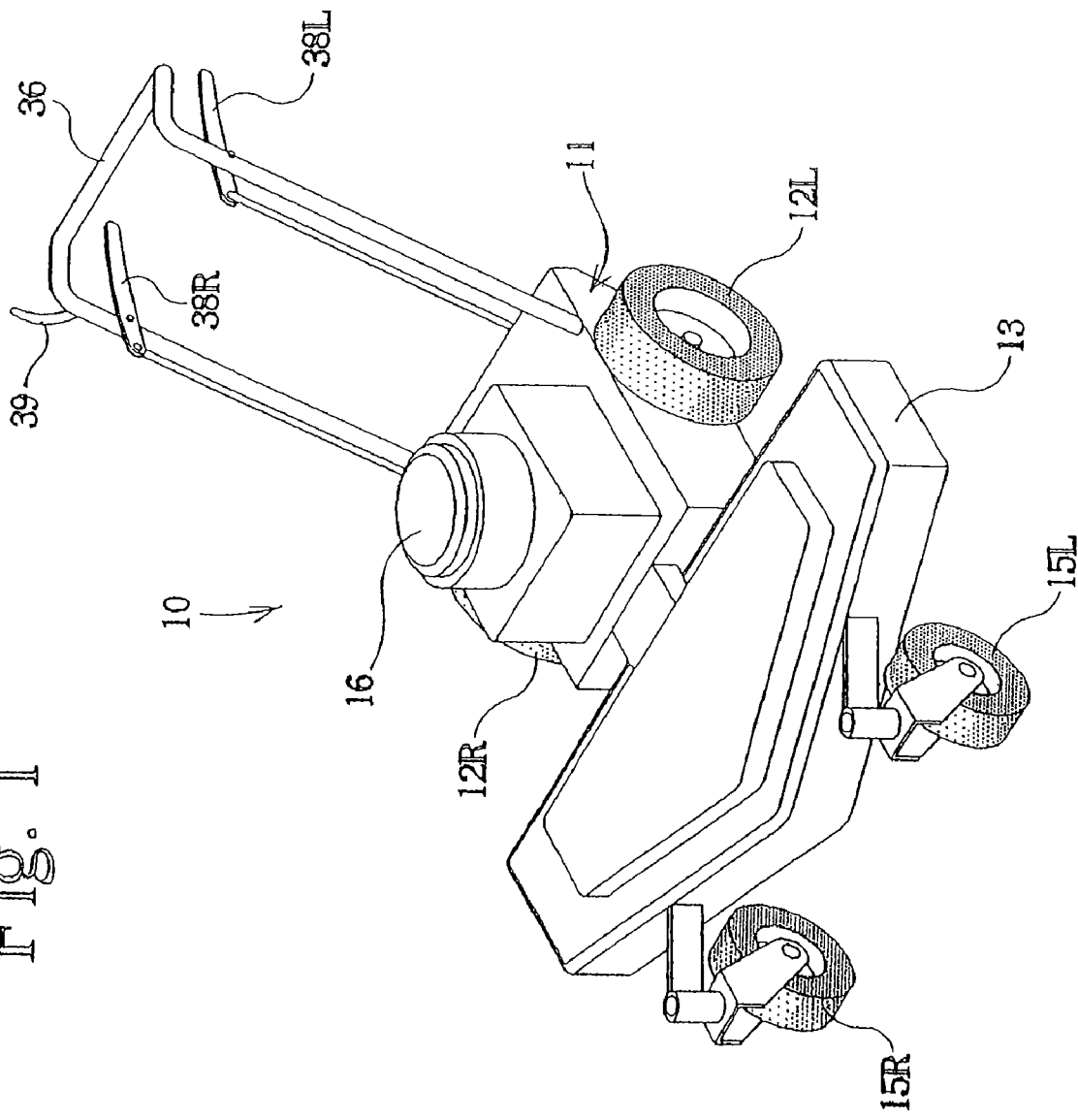
FIG. 1 illustrates a perspective view of a walk behind mower, such mower being an example of one type of vehicle on which the axle driving apparatus of the present invention can be used.
Figure 2:
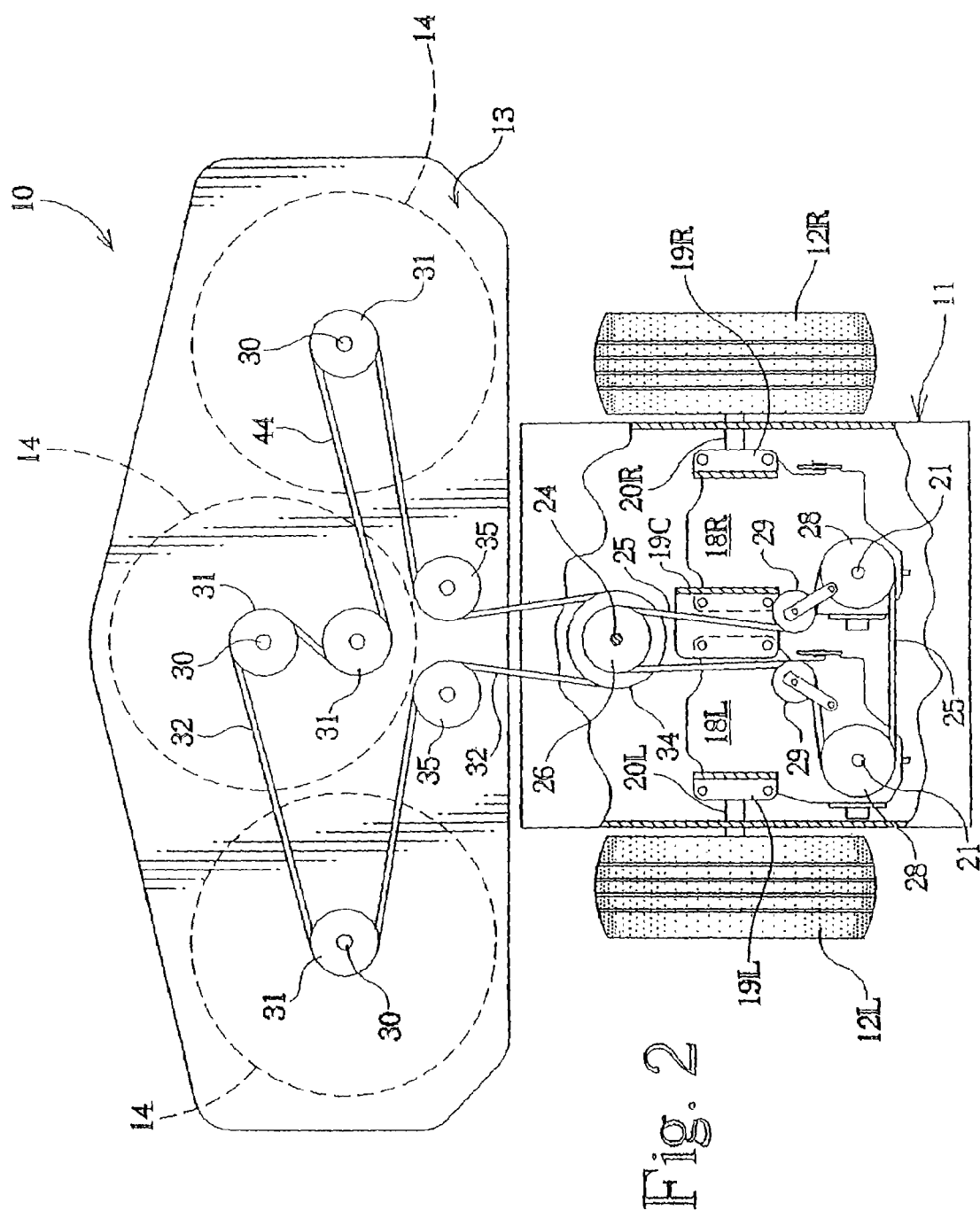
FIG. 2 illustrates a plan view, partially in section, of a walk behind mower having an axle driving apparatus of the present invention mounted thereon.

In FIGS. 1 and 2, a walk behind mower utilizing an axle driving apparatus of the present invention is illustrated generally at 10. The mower 10 includes a body frame 11 movably supported by oppositely disposed drive wheels 12L and 12R. Secured to the forward portion of the body frame 11 is a mower deck 13 which is supported by a pair of caster wheels 15L and 15R, and on which are rotatably mounted a plurality of blade members 14 which are utilized for cutting grass and other vegetation.

Figure 3:
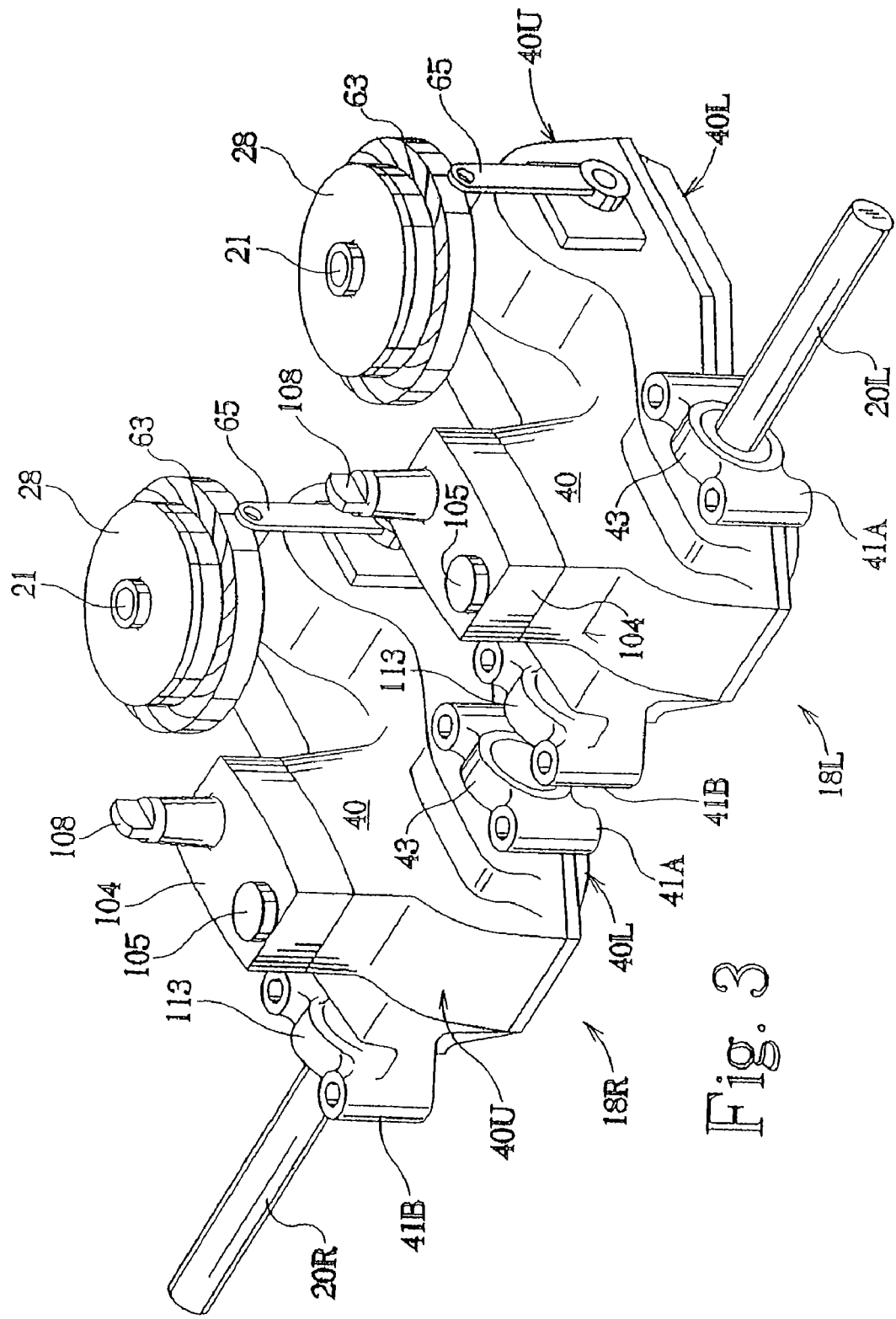
FIG. 3 illustrates a perspective view of an axle driving apparatus of the present invention.
Figure 4:
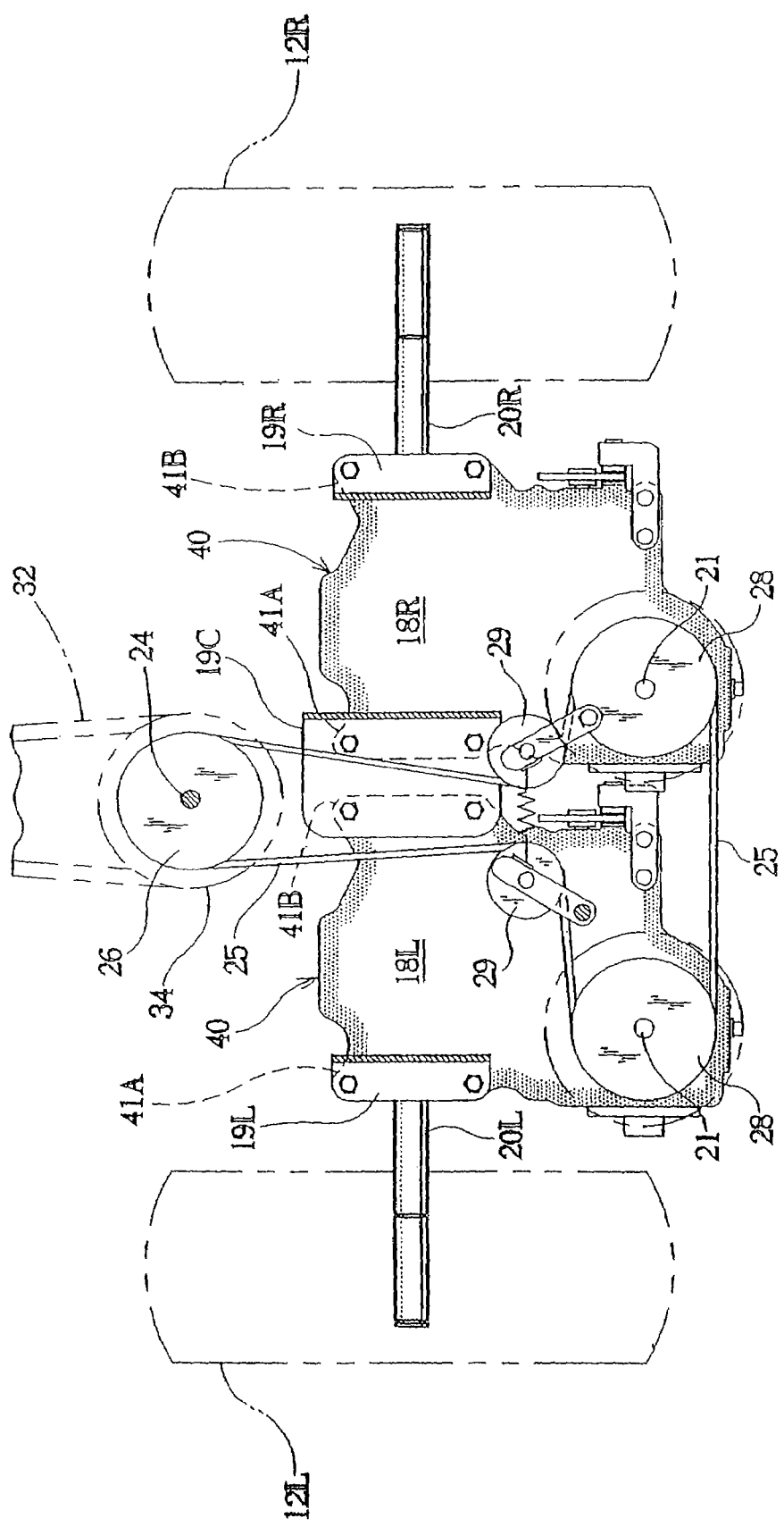
FIG. 4 illustrates a plan view of an axle driving apparatus of the present invention.

The drive wheels 12L and 12R are rotatably driven by a prime mover, such as the illustrated engine 16, mounted on the body frame 11. More specifically, and as best illustrated in FIGS. 2-4, the axle driving apparatus 10 includes adjacently disposed left and right axle driving units 18L and 18R, respectively, which are suspended from mounting members 19L, 19R, and 19C provided oil the body frame 11. The axle driving units 18L and 18R support and selectively rotate the axles 20L and 20R on which the drive wheels 12L and 12R are carried. In this regard, each of the axle driving units 18L and 18R includes a speed change mechanism which is drivingly connected to the operatively associated axle 20L or 20R such that the rotational speed and direction of the drive wheels can be independently selected. As will be discussed in detail below, in the preferred embodiment the speed change mechanisms comprise hydraulic stepless speed change transmissions 22 (e.g. FIG. 5). Further, each of the units 18L and 18R includes an input shaft 21 the rotation of which operatively drives the hydraulic transmission 22. In the preferred embodiment, the input shafts 21 extend substantially vertically from enlarged portions of the housings of the axle driving units 18L and 18R. This vertical orientation is useful when the engine of the self-propelled vehicle has a vertically disposed crank shaft, as in the case of the illustrated mower 10. Given the relative disposition of the input shafts 21 and the crank shaft 24 of the engine 16, the shafts 21 can be drivingly connected to the crank shaft 24 by as single drive belt 25.

In the preferred illustrated embodiment, the crank shaft 24 is provided with a drive pulley 26 about which the drive belt 25 is received, and each of the shafts 21 is provided with an input pulley 28 around which the drive belt 25 is received. Further, the belt is routed between a pair of tension pulleys 29 which are supported on the body frame 11. Preferably, the drive pulley 26 and the input pulleys 28 are triangularly disposed in a common, substantially horizontal plane so as to make efficient use of tie space within the body frame 11. It will also be noted in this regard that the advantageous positioning of components within the axle driving units 18L and 18R, which will be discussed in detail below, allows the housings of the axle driving units to be reduced in height compared with conventional axle driving units. This reduction in height, together with the vertical disposition of the input shafts 21 and advantageous disposition of drive and input pulleys, allows the body frame 11, and the engine 16 mounted therein, to be reduced in height and disposed in a lower position, thereby lowering the center of gravity of the mower 10 and improving roadability.

As illustrated in FIG. 2, the engine 16 also serves to rotatably drive the blade members 14. In this regard, each of the blade members 14 is mounted on a shaft 30 provided with a pulley 31. A drive belt 32 is received around a further drive pulley 34 mounted on the crank shaft 24 and around the pulleys 31 to effect rotation of the blade members 14. Further, tensioning pulleys 35 are provided to maintain tension on the belt 32 during operation.

It will be recognized by those skilled in the art that the operator of the mower 10 walks behind the mower during operation, and a steering bar 36 is provided to facilitate the steering of the mower 10 during use. The mower 10 is moved in forward and reverse directions by rotating the drive wheels 12L and 12R at the same speed, and turns are accomplished by selectively rotating the drive wheels 12L and 12R at different speeds. As will become clear from the discussion below, the hydraulic transmissions 22 of the axle driving units 18L and 18R allow the speed and rotational direction of the drive wheels 12L and 12R to be independently altered such that both the speed and the direction of movement of the mower can be controlled. Accordingly, steering control levers 38L and 38R are mounted on the steering bar 36 and connected by suitable linkages to transmission control levers 65 (discussed below) on the axle driving units 18L and 18R. Further, an accelerator 39 is mounted on the steering bar 36 to control the operation of the engine 16.

More specifically with respect to the axle driving apparatus of the present invention, FIGS. 2-12 illustrate the construction of one preferred embodiment of the apparatus. As noted above, the apparatus of the present invention includes a pair of axle driving units 18L and 18R which are adjacently disposed, and it will be noted that in the preferred embodiment the units 18L and 18R are substantially identical except for the disposition of the operatively associated axles 20L and 20R. Accordingly, in discussing the Figures, components and features which are common to both axle driving units will be referenced with common reference numerals.

The axle driving unit 18L includes a housing 40 comprising an upper half housing 40U and a lower half housing 40L joined to each other through a peripheral joint or junction surface. When the housing 40 is mounted in an operating position on the body frame 11 of the mower 10, the joint surface is substantially horizontally disposed. As noted above, in the preferred embodiment of the present invention, the speed change mechanism comprises a hydraulic stepless speed change transmission 22. Accordingly, the housing 40 is sealed such that lubricating oil can be charged into the housing and used as operating oil for the hydraulic transmission. It will also be noted that, in order to facilitate the mounting of the unit 18L on the body frame 11, the housing 40 defines a first mounting boss 41A at a forward left portion of the housing 40 which releasably engages the left mounting member 19L of the body frame 11. The housing 40 further defines a second mounting boss 41B at a forward right portion of the housing 40 which releasably engages the center mounting member 19C.

Figure 5:
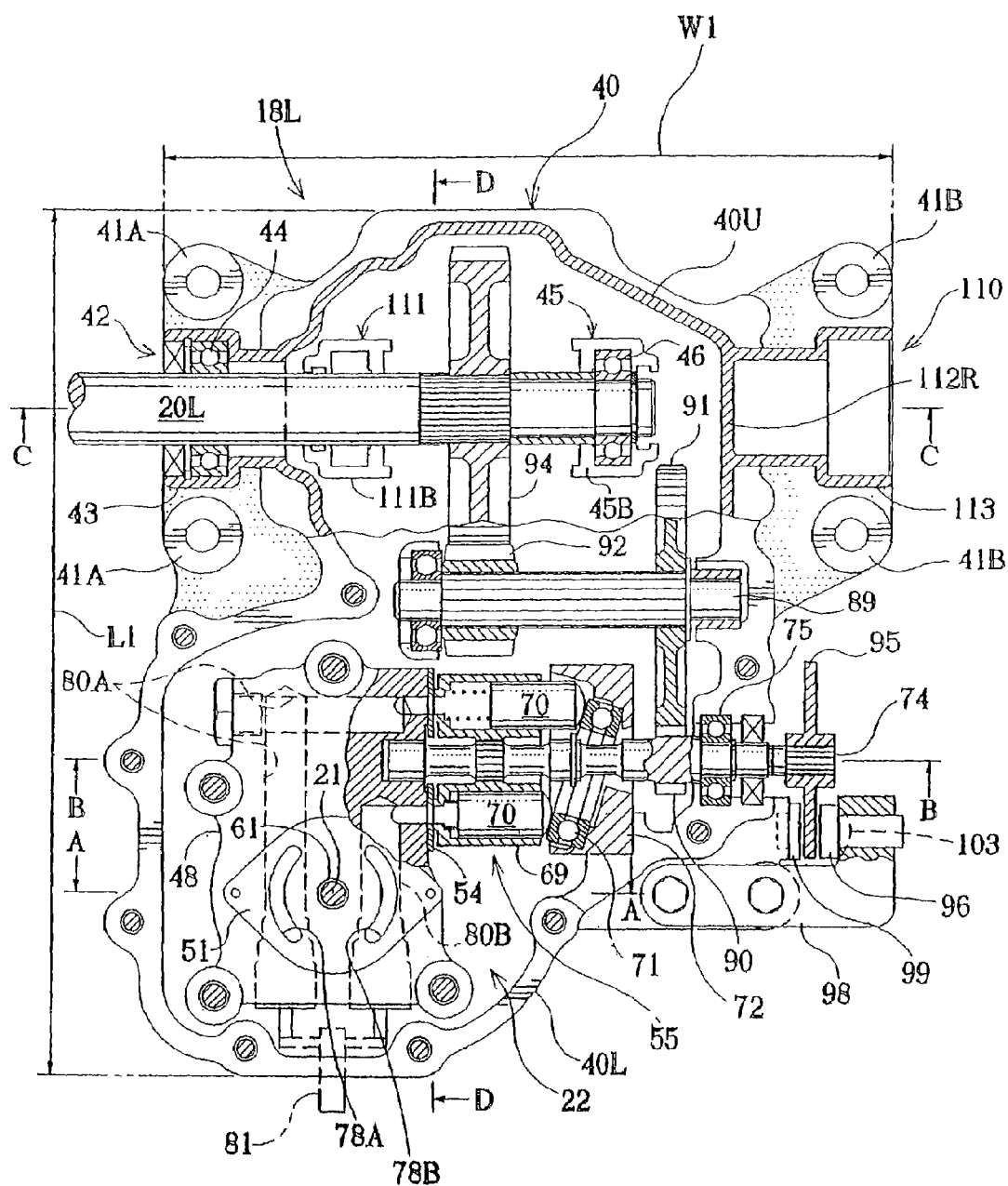
FIG. 5 illustrates a plan view, partially in section, of an axle driving unit of the present invention.
Figure 9:
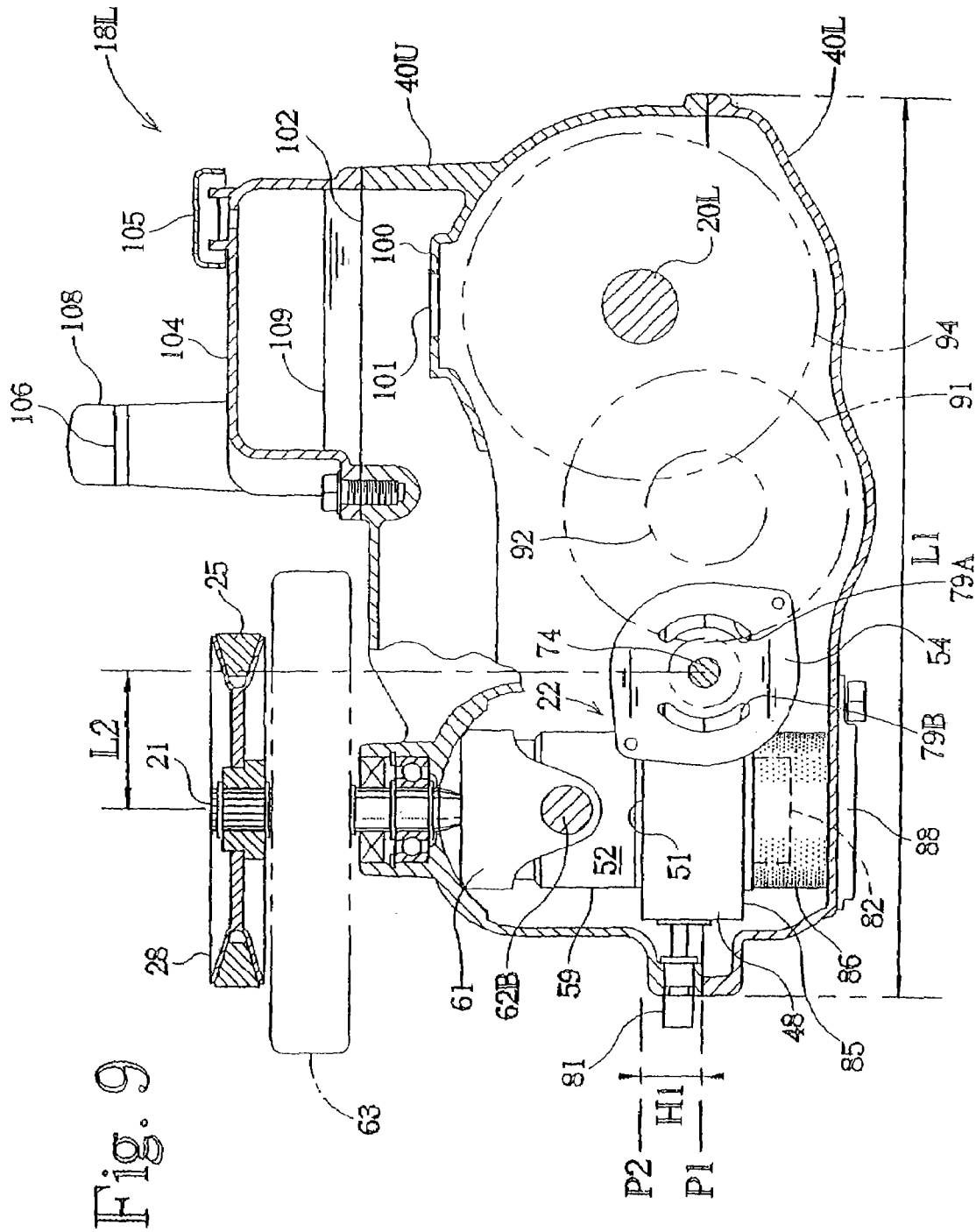
FIG. 9 illustrates a side elevation view, in section at D-D in FIG. 5, of an axle driving unit of the present invention.

The axle 20L of the axle driving unit 18L projects from the left side of the housing, and driving wheel 12L mounts at the distal end of the left axle 20L. In order to rotatably support the axle 20L in the housing 40, the axle driving unit 18L includes a first bearing support 42 including a hollow tube portion 43 defining a bearing seat for receiving a first roller bearing 44. As best illustrated in FIG. 5, the first roller bearing 44 rotatably supports the axle 20L proximate the point at which the axle projects from the housing 40. In the illustrated embodiment, the first bearing support 42 is provided in the upper half housing 40U such that the rotational axis of the axle 20L is positioned in a horizontal plane disposed roughly midway along the vertical dimension of the housing 40. This disposition of the axle 20L results in a well balanced axle driving unit and, as illustrated in FIG. 9, allows the final gear 94 (discussed below) to be accommodated in the housing without providing an expanded region in the lower half housing which would reduce ground clearance. However; it is contemplated that the roller bearing support 42 can be cooperatively defined by the upper and lower half housings 40U and 40L where the joint surface between the upper and lower housings is alternatively disposed in a common plane with the rotational axis of the axle 20L, or can be provided in the lower half housing 40L, where the join surface is disposed in a plane above the rotational axis of the axle 20L.

A second bearing support 45 is also provided which defines a bearing seat for receiving a second roller bearing 46. As illustrated, the second roller bearing supports the proximal end of the axle 20L. In the preferred embodiment, the second bearing support 45 comprises a first component 45A provided on the upper half housing 40U, and a second component 45B provided on the lower half housing 40L such that the components 45A and 45B cooperatively define the bearing seat for receiving the second roller bearing 46 (See FIG. 8).

Figure 10:
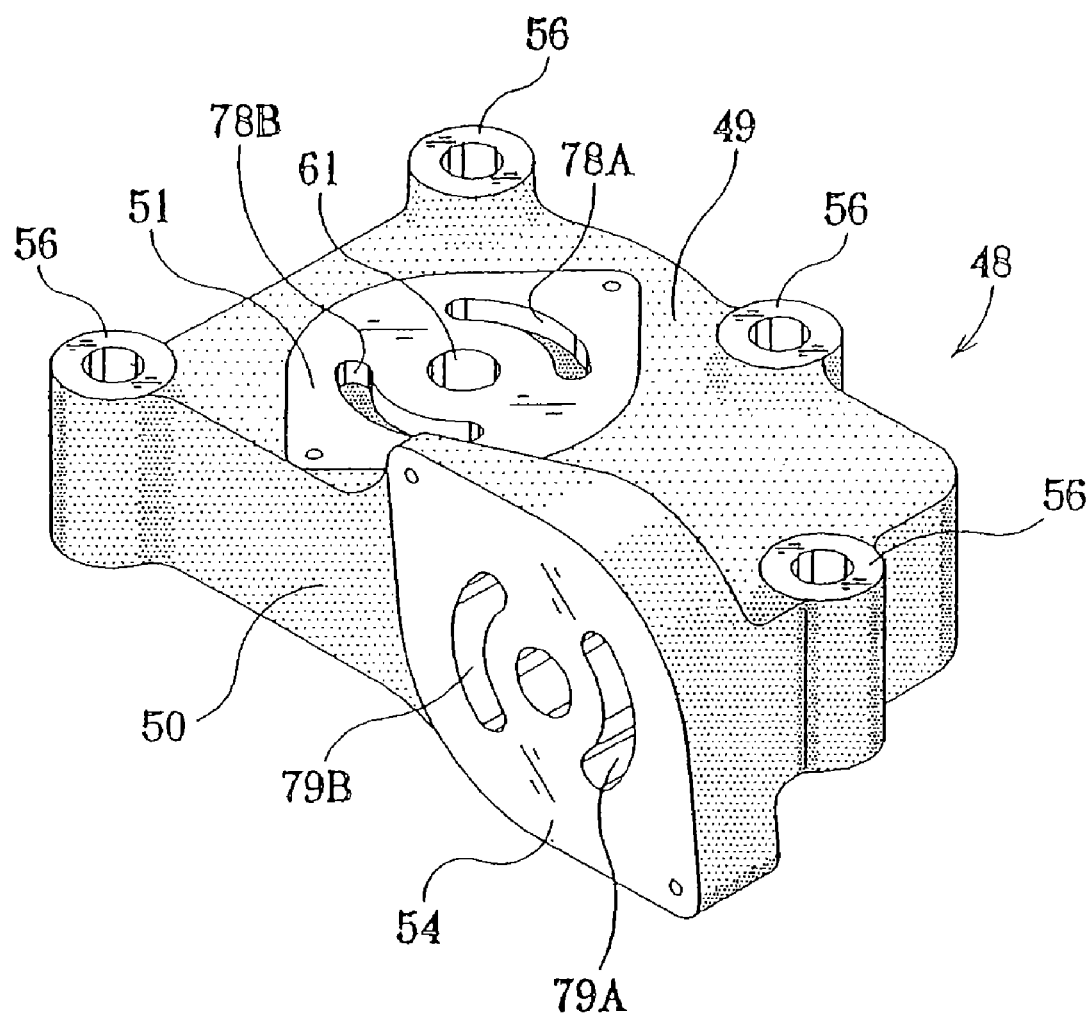
FIG. 10 illustrates a perspective view of a center section of an axle driving unit of the present invention.

In order to accommodate the transmission 22, the real portions (portions toward the rear of the mower 10) of upper and lower half housings 40U and 40L are enlarged in a direction perpendicular to the longitudinal axis of the axle 20L, Therefore, the housing of the axle driving unit is longer (length L) than it is wide (width W; see FIG. 5) which facilitates the side-by-side mounting of the two axle driving units. The hydraulic stepless transmission 22 includes a center section 48 which is mounted in the enlarged region of the housing 40. As shown in FIG. 10, the center section 48 is a single, elongated piece having an upper surface 49 and a side surface 50 which are adjacent and perpendicular to each other. A pump mounting surface 51 is defined at the rear portion (toward the rear of the mower 10) of upper surface 49 for mounting the rear a hydraulic pump 52. At the forward portion of side surface 50, a motor mounting surface 54 is defined for mounting a hydraulic motor 55. As shown in FIG. 9, the center of the motor mounting surface 54 extends in parallel to pump mounting surface 51 and is offset downwardly therefrom by a height H1. It will be recognized that by limiting this offset distance, the overall height of the enlarged region of the housing 40 can be limited. Further, the pump mounting surface 51 of the center section 48 extends horizontally with respect to the axle 20L, and is rearwardly spaced from the axles which also facilitates the reduction of height of the housing 40.

As shown in FIG. 10, housing mounting faces 56 are formed on the upper surface 49 of the center section 48 and are preferably disposed in common plane with the pump mounting surface 51. Therefore, housing mounting faces 56 can be ground when the pump mounting surface 51 is ground so that the processing time for the center section 48 can be reduced. Bolt insertion bores are provided at the housing mounting faces 56, and center section 48 is fixed to the inner wall of the enlarged region of upper half housing 40U by connecting bolts inserted into the bores. Alternatively, the pump mounting surface 51 and the motor mounting surface 54 can be provided integral to the inner wall of the lower half housing 40L by increasing the thickness of such inner wall in the enlarged region. However, it is preferable to use a center section 48 which is separate from the housing to facilitate processing of the housing, and to prevent oil from leaking out of the housing.

Figure 6:
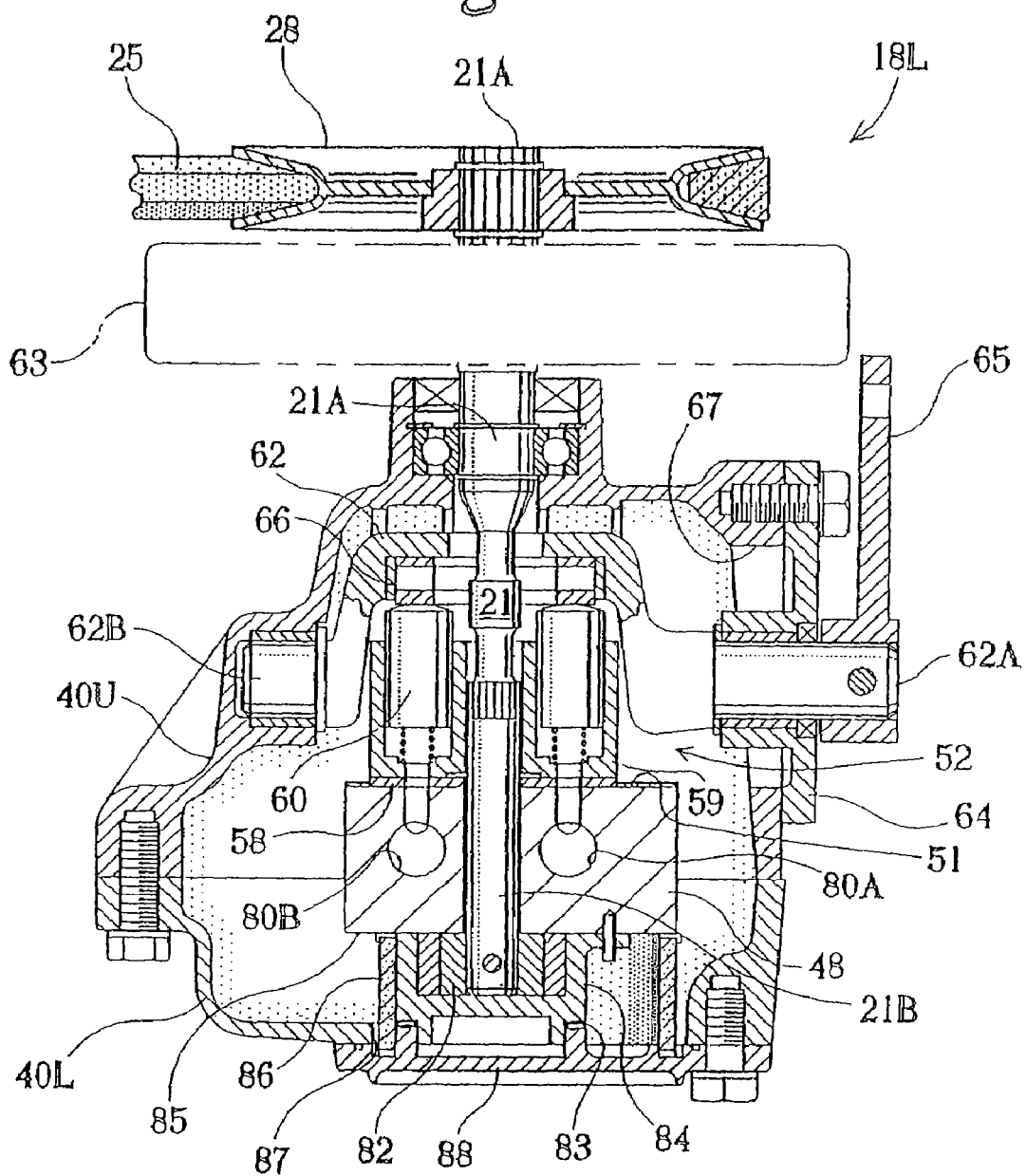
FIG. 6 illustrates a front elevation view, in section taken at A-A in FIG. 5, of an axle driving unit of the present invention.

As illustrated in FIG. 6, a valve plate 58 is mounted onto pump mounting face 51 to accommodate the mounting of the hydraulic pump 52 of the hydraulic stepless transmission 22. In the preferred illustrated embodiment, the pump 52 comprises an axial piston type variable displacement hydraulic pump. In this regard, the hydraulic pump 52 includes a cylinder block 59 rotatably disposed on the valve plate 58. Pistons 60 are fitted into a plurality of cylinder bores of cylinder block 59 for reciprocating movement in response to biasing springs. It will be recognized by those skilled in the art that rotation of the input shaft 21 serves to drive the hydraulic pump 52. In this regard, the input shaft 21 engages with a spline bore provided on the rotational axis of cylinder block 59 such that the cylinder block 59 rotates with the input shaft 21. The input shaft 21 is rotatably supported at its upper end portion by upper half housing 40U and a distal end portion 21A of the shaft 21 extends out of the housing 40. The lower end portion 21B of the input shaft 21 is received through a bore 61 provided in the center section 48 so as to be maintained in the proper axial alignment. One of the input pulleys 28 is secured to the upper end portion 21A of the input shaft 21 and, as note above, the pulley 28 is selectively rotated by the drive belt 25. It will also be noted that a cooling fan 63 is mounted on the input shaft 21 for cooling the axle drive unit during operation.

In the preferred illustrated embodiment, a trunnion-type movable swash plate 62 is provided for selectively varying the displacement of the hydraulic pump 52. In this regard, the swash plate 62 includes a first trunnion shaft 62A which is supported by a lid 64 mounted over all opening 67 in the upper half housing 40U, and includes a further trunnion shaft 62B which is supported by a bearing bore provided at the inner wall of upper half housing 40U (See FIG. 6). The trunnion shaft 62A projects outwardly from the lid 64 and a speed control lever 65 is mounted on the projection. Accordingly, selected rotation of the control lever 65 pivots the swash plate 62 on the common rotational axis of the trunnion shafts 62A and 62B. An opening is provided in the swash plate 62 to accommodate the input shaft 21, and the swash plate 62 is movably disposed such that the heads of the pistons 60 abut against a thrust bearing 66 of the swash plate 62. Accordingly, pivotal movement of the swash plate 62 alters the angular disposition of the thrust bearing 66 as it engages the pistons 60, thereby allowing alteration of the discharge direction and discharge rate of the hydraulic pump 52.

It will be understood that whereas an axial piston type variable displacement hydraulic pump is illustrated in the Figures and has been described above, a radial piston type hydraulic pump or a gear type pump may be interchangeably used. Further, whereas in the embodiment of FIGS. 2-12 the pump 52 incorporates a trunnion-type swash plate, it will be understood by those skilled in the art that a cradle-type swash plate can be interchangeably used.

Figure 7:
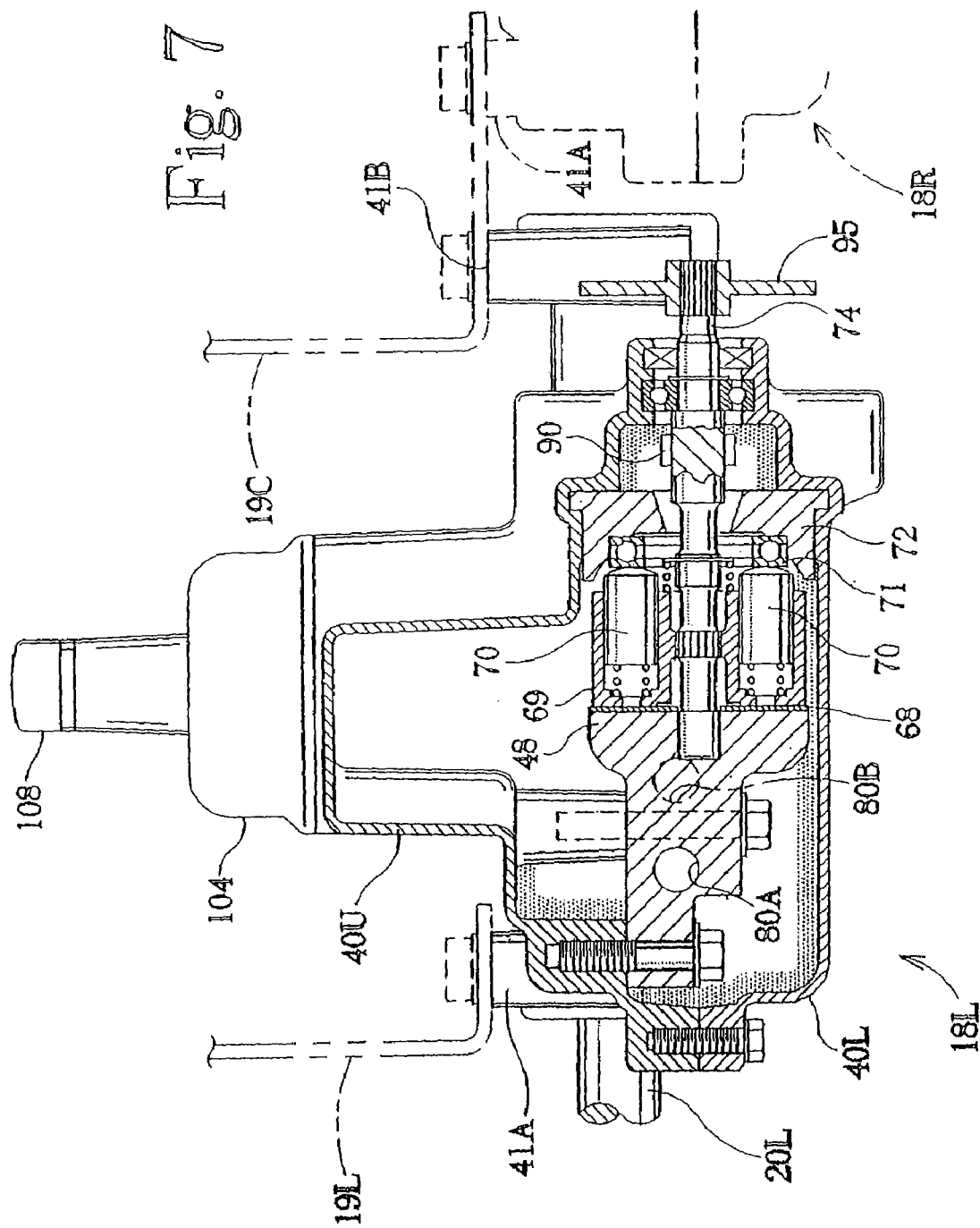
FIG. 7 illustrates a rear elevation view, in section at B-B in FIG. 5, of an axle driving unit of the present invention.
Figure 8:
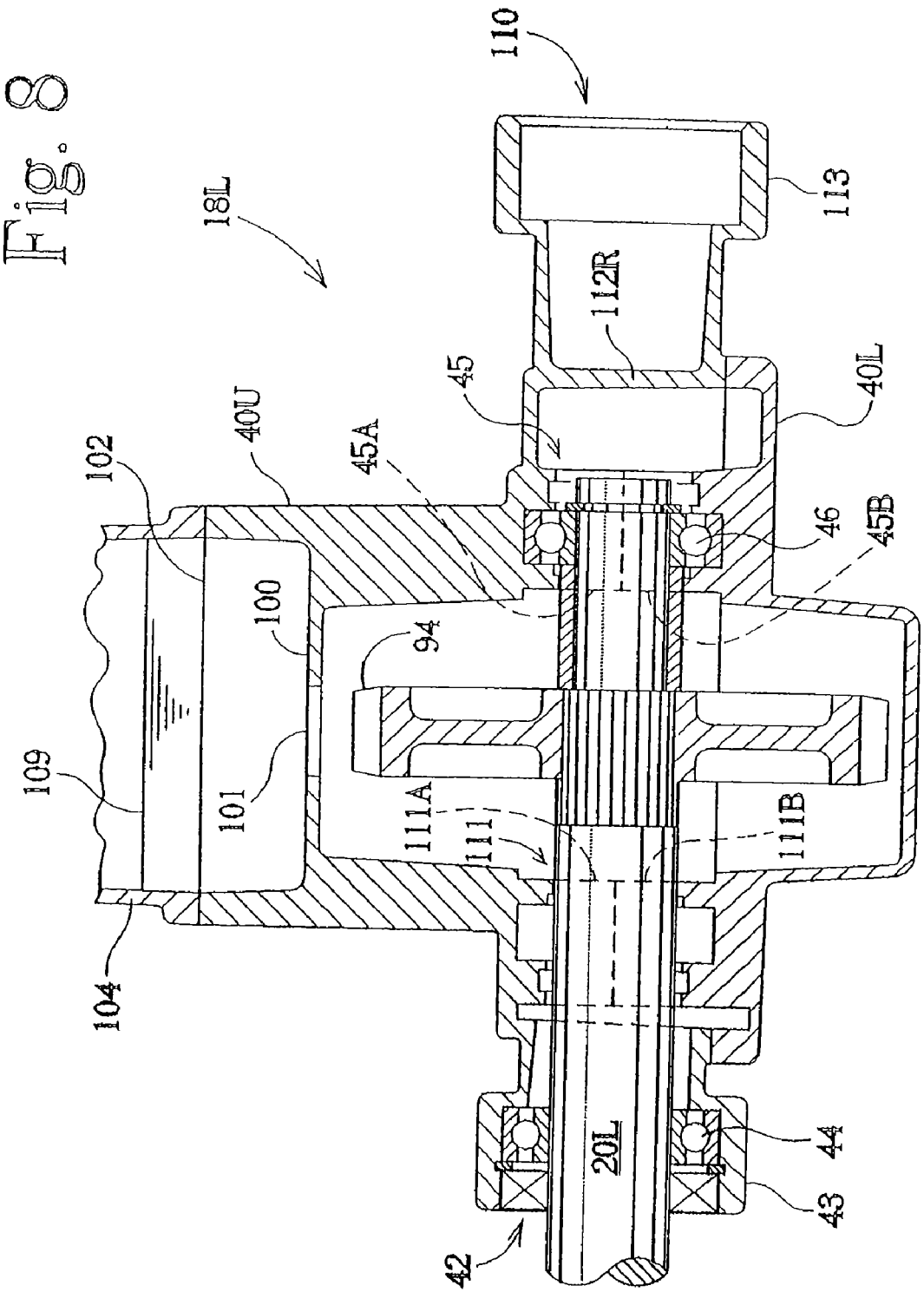
FIG. 8 illustrates a rear elevation view, in section at C-C in FIG. 5, of an axle driving unit of the present invention.

In the preferred illustrated embodiment, the hydraulic motor 55 comprises all axial-piston type fixed displacement hydraulic motor. As best illustrated in FIGS. 5 and 7, a valve plate 68 is mounted on the motor mounting surface 54 of the center section 48, and the hydraulic motor 55 includes a cylinder block 69 which is rotatably disposed on the plate 68. A plurality of pistons 70 are fitted for reciprocating movement into a plurality of cylinder bores defined in the cylinder block 69. The heads of pistons 70 abut against a thrust bearing 71 of a fixed swash plate 72 disposed between upper half housing 40U and lower half housing 40L. An input or motor shaft 74 engages a spline bore provided on the rotational axis of cylinder block 69 such that the motor shaft 74 rotates with the cylinder block 69.

The rotational axis of cylinder block 69 is preferably positioned in the same plane as the joint surface of the upper and lower half housings to facilitate the rotational mounting of the motor shaft 74. In this regard, one end of motor shaft 24 is supported by a bearing 75 which is sandwiched between the upper half housing 40U and the lower half housing 40L, and the other end of the shaft 74 is received by, and supported in, a receptor 76 provided in the center section 48. It will be noted that, when the hydraulic pump and the hydraulic motor are disposed on the center section 48 described above, input shaft 21 and motor shaft 74 are perpendicular to each other, and the input shaft 21 is offset from the motor shaft 74 by a length L2 (see FIG. 9) in the direction apart from the axle 20L.

As shown in FIGS. 5, 9, and 10, a pair of kidney-shaped ports 78A and 78B is open on pump mounting face 51 of the center section 48 to take in or discharge oil in cylinder block 59. Further, a pair of kidney-shaped ports 79A and 79B is open on motor mounting face 54 to take in or discharge oil in cylinder block 69. In order to establish fluid communication between the port 78A and the port 79A, a first oil passage 80A is provided in the center section 48, and in order to establish fluid communication between the port 78B and the port 79B, a second oil passage 80B is provided in the center section 48. Accordingly, a closed circuit is defined to circulate the operating oil between the hydraulic pump and hydraulic motor. It will also be noted that a check valve means is provided which includes a check valve (not shown) disposed in each of the passages 80A and 80B. The check valve means selectively places the passages 80A and 80B in fluid communication with each other, thereby enabling the hydraulic motor to idle. A push rod 81 which projects from the upper half housing 40U is provided for manually actuating the check valves.

It will be recognized from the above that the hydraulic pump 52 and hydraulic motor 55, which are placed in closed circuit fluid communication by the advantageously configured center section 48, provide a hydraulic stepless speed change transmission. In this regard, the rotation of the input shaft 21 drives pump 52, and by selective altering the discharge direction and discharge rate of the pump 52 through manipulation of the speed control lever 65, the hydraulic motor produces stepless output rotation of the motor shaft 74.

In order to facilitate the operation of the transmission, operating oil supply means is provided for replenishing oil that has leaked out from the center section 48. The supply means may be the hydraulic pump itself, or, as in the preferred illustrated embodiment, a charge pump 82 can be provided. The charge pump 82, as shown in FIG. 6, is a trochoid pump which is contained in a charge pump casing 84 biased toward a charge pump mounting surface 85 on the lower surface of center section 48 by a spring member 83, with the spring member 83 being used for adjusting the discharge oil pressure of the charge pump 82. The charge pump 82 is driven by the input shaft 21 and is in fluid communication with the oil passages 80A and 80B through a pair of check valves (not shown). As will be appreciated by those skilled in the art, when operating oil leaks from the closed circuit defined by the transmission 22, the charge pump 81 serves to draw lubricating oil in the housing 40, in through an oil filter 86, and communicate the oil to the oil passages 80A and 80B in response to the drop in oil pressure in such passages. It will also be noted that the lower housing 40L is provided with an opening 87 releasably covered by a lid 88 to facilitate maintenance of the oil filter 86.

As illustrated in FIGS. 5 and 9, the motor shaft 74 is disposed in parallel to the axle 20L, which simplifies the transmission of drive force from the motor shaft 74 to the axle 20L. In this regard, in order to communicate the rotation of the motor shaft 74 to the axle 20L, a counter shaft 89 is provided between the axle 20L and the motor shaft 74 which extends parallel to the axle and motor shaft. A gear 90 is provided on motor shaft 74 which engages with a larger diameter gear 91 mounted on the counter shaft 89. A smaller diameter gear 92 on the counter shaft 89, in turn, engages with a final gear 94 mounted on the axle 20L. As illustrated in FIG. 9, the counter shaft 89 is preferably positioned in a first plane P1 which corresponds to the plane of the joint surface of the housing 40. This allows the axial ends of the counter shaft 89 to be supported by a pair of bearings interposed between the upper and lower half housings 40U and 40L (See FIG. 5). It will be understood that the axle 20L can also be disposed in the same plane P1 such that the bearing 44 which rotatably supports the axle 20L can be mounted between the upper and lower half housings 40U and 40L. However, as noted above, disposing the axle 20L on the plane P1 would require expansion of the lower half housing 40L to accommodate the lower position of the final gear 94, thereby undesirably increasing the height of the housing 40 and decreasing ground clearance. Accordingly, in the illustrated embodiment, the axle 20L is disposed above the plane P1 to minimize the height of the housing 40.

In FIG. 5 a braking mechanism for selectively braking the motor shaft 74 is also illustrated. The braking mechanism includes a brake friction plate 95 fixed on the motor shaft 74 so as to rotate with the shaft 74. Also, a pressure member 96 is provided at one end of a support member 98, with the support member 98, in turn, being linked to an operating lever (not shown) for actuating the brake. When the operating lever is actuated, a cam mechanism 103 causes the pressure member 96 to be placed in press contact with the braking friction plate 95 such that the plate 95 is clamped between the pressure member 96 and a stationary braking plate 99 mounted on the housing 40, thereby enabling the motor shaft 74 to be braked. However, the illustrated braking mechanism is merely illustrative of one suitable braking mechanisms, and other suitable mechanisms can be used if desired.

As shown in FIG. 9, in the preferred embodiment a partition 100 for covering an upper portion of the final gear 94 is integrally formed in upper half housing 40U and an oil flow-through ventilation bore 101 is formed in the partition 100. An opening 102 is formed at a portion of the upper wall of upper half housing 40U positioned above the partition 100, and covered with a cover member 104. Cover member 104 is provided with a breather 105 and an oil supply opening 106 releasably covered by an oil supply lid 108. A predetermined amount of oil is charged into the housing 40 so that the boundary plane of the oil is disposed approximately as referenced at 109 in FIG. 9. Air mixed in the oil when charged into the housing is collected in an air reservoir oil the cover member 104 through ventilation bore 101. Partition 100 is fined at the lower portion with oil, so that, even when the various gears rotate, the air in the air reservoir is scarcely mixed with oil. When the axle driving unit is operated for a long time, the oil volume expands. The volume of air in the air reservoir decreases to accommodate the expanded volume of oil.

Figure 11:
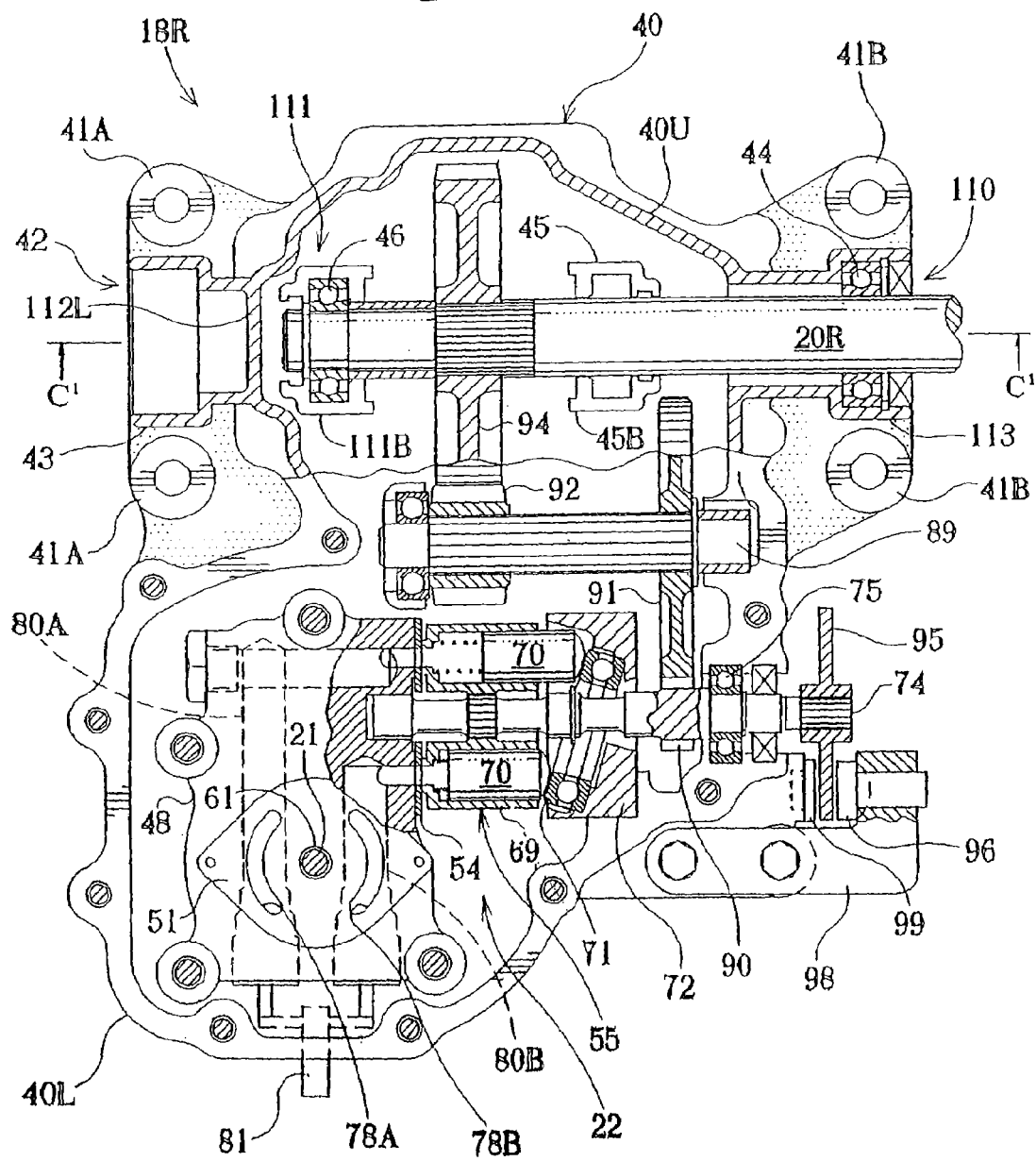
FIG. 11 illustrates a plan view, partially in section, of an axle driving unit of the present invention.
Figure 12:
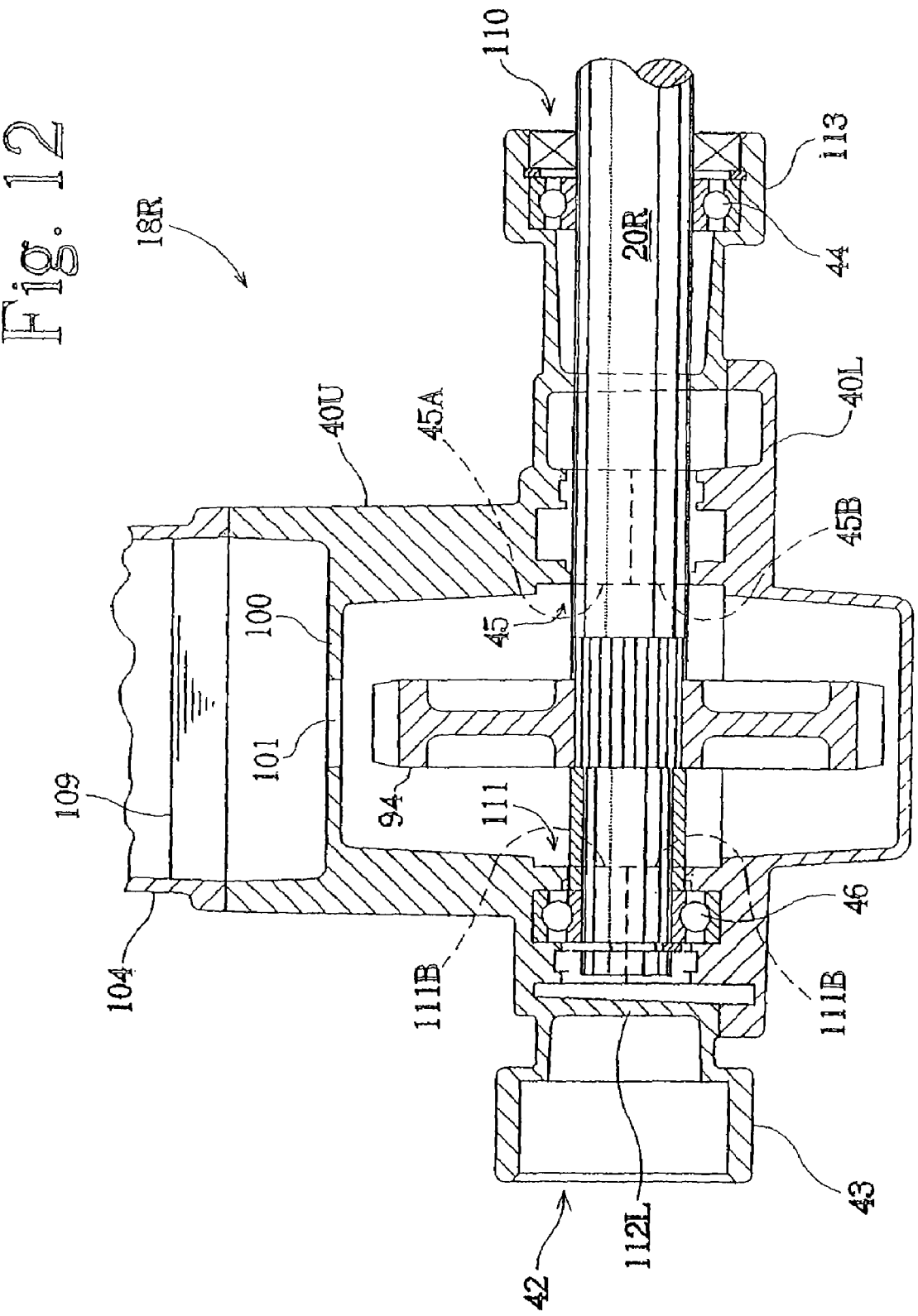
FIG. 12 illustrates a rear elevation view, in section at C-C in FIG. 11, of an axle driving unit of the present invention.
Figure 13:
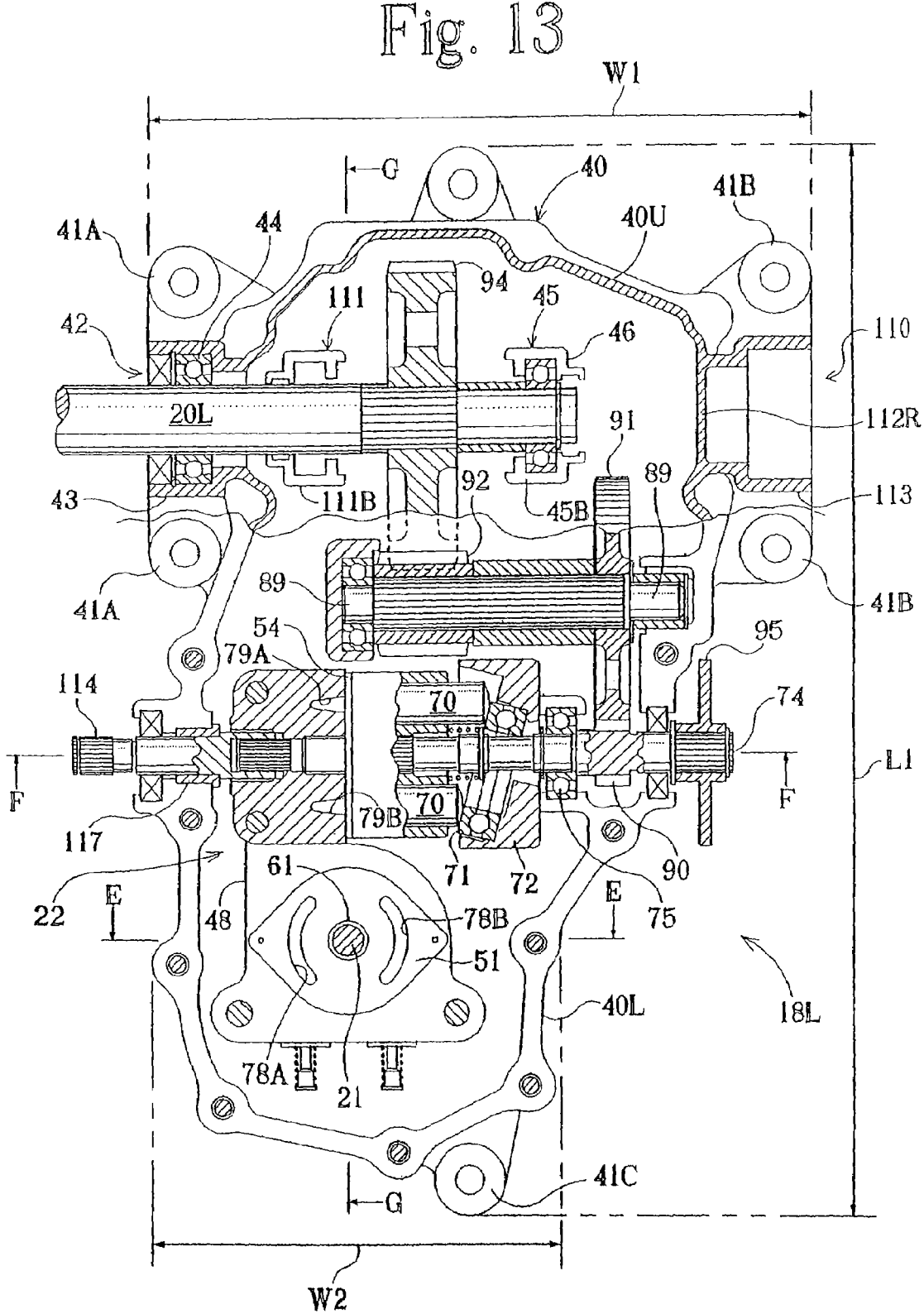
FIG. 13 illustrates a plan view, partially in section, of an axle driving unit of a second embodiment of the present invention.
Figure 14:
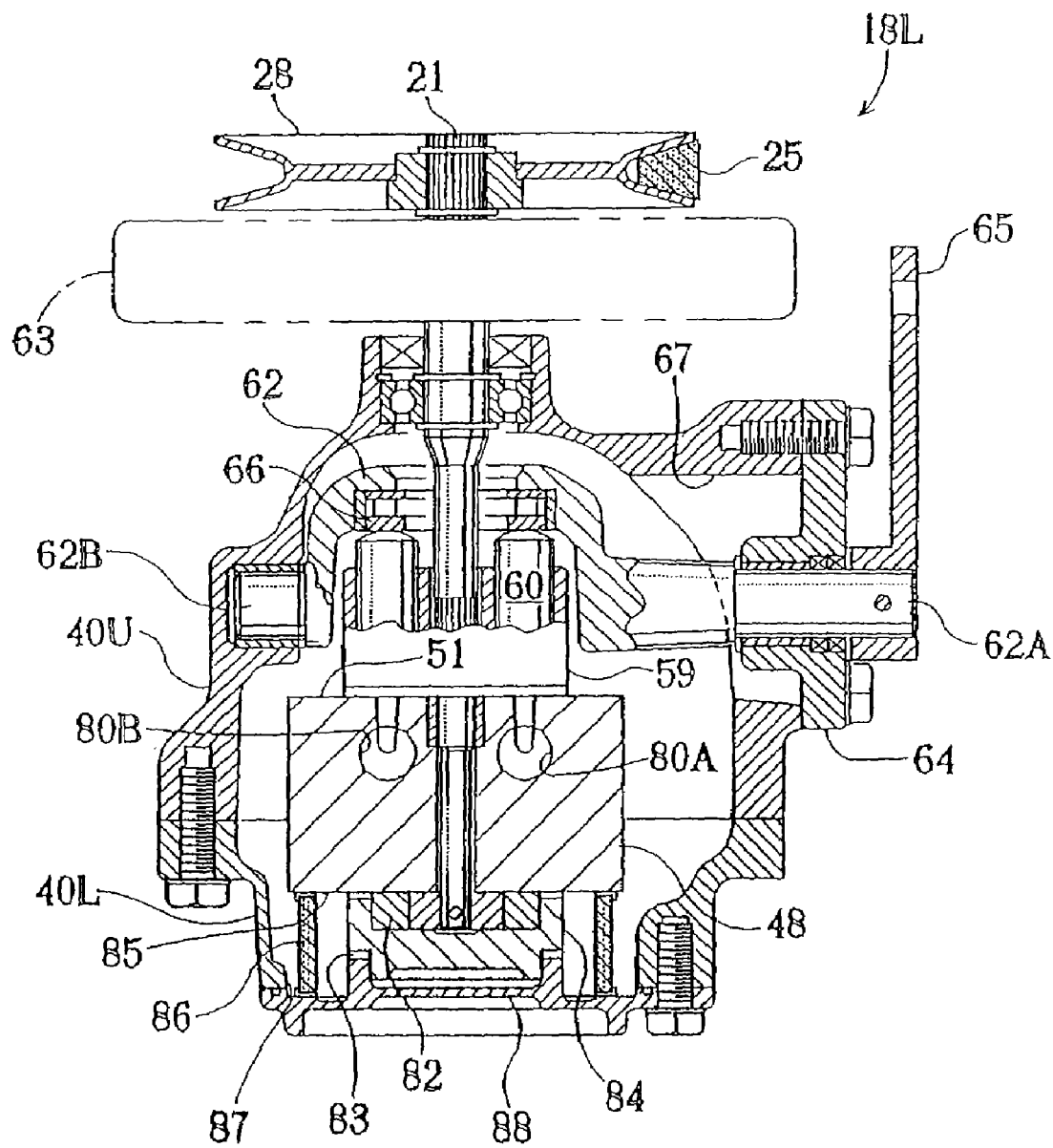
FIG. 14 illustrates a front elevation view, in section at E-E in FIG. 13, of an axle driving unit of the second embodiment of the present invention.
Figure 15:
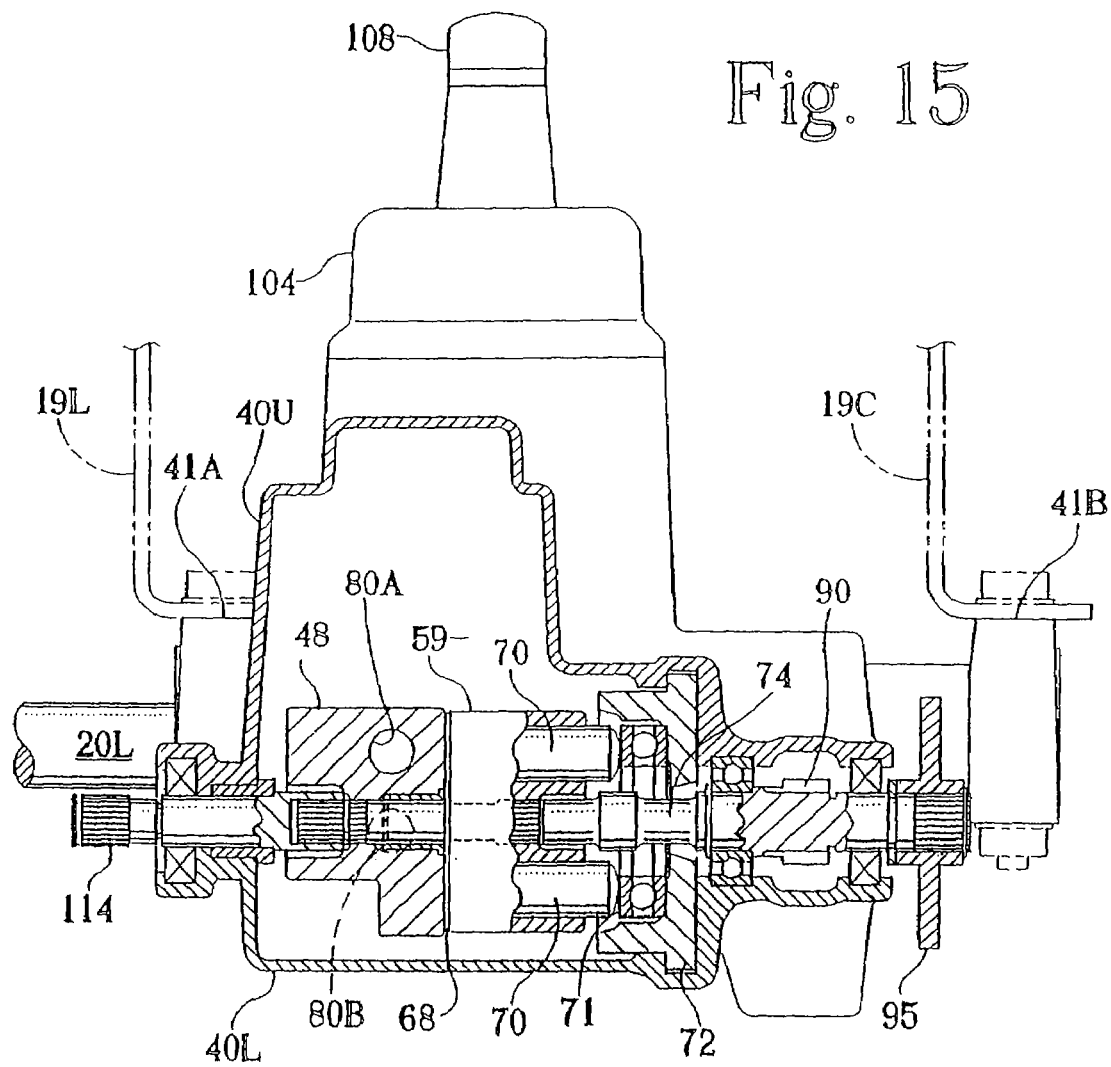
FIG. 15 illustrates a rear elevation view, in section at F-F in FIG. 13, of an axle driving unit of the second embodiment of the present invention.
Figure 16:
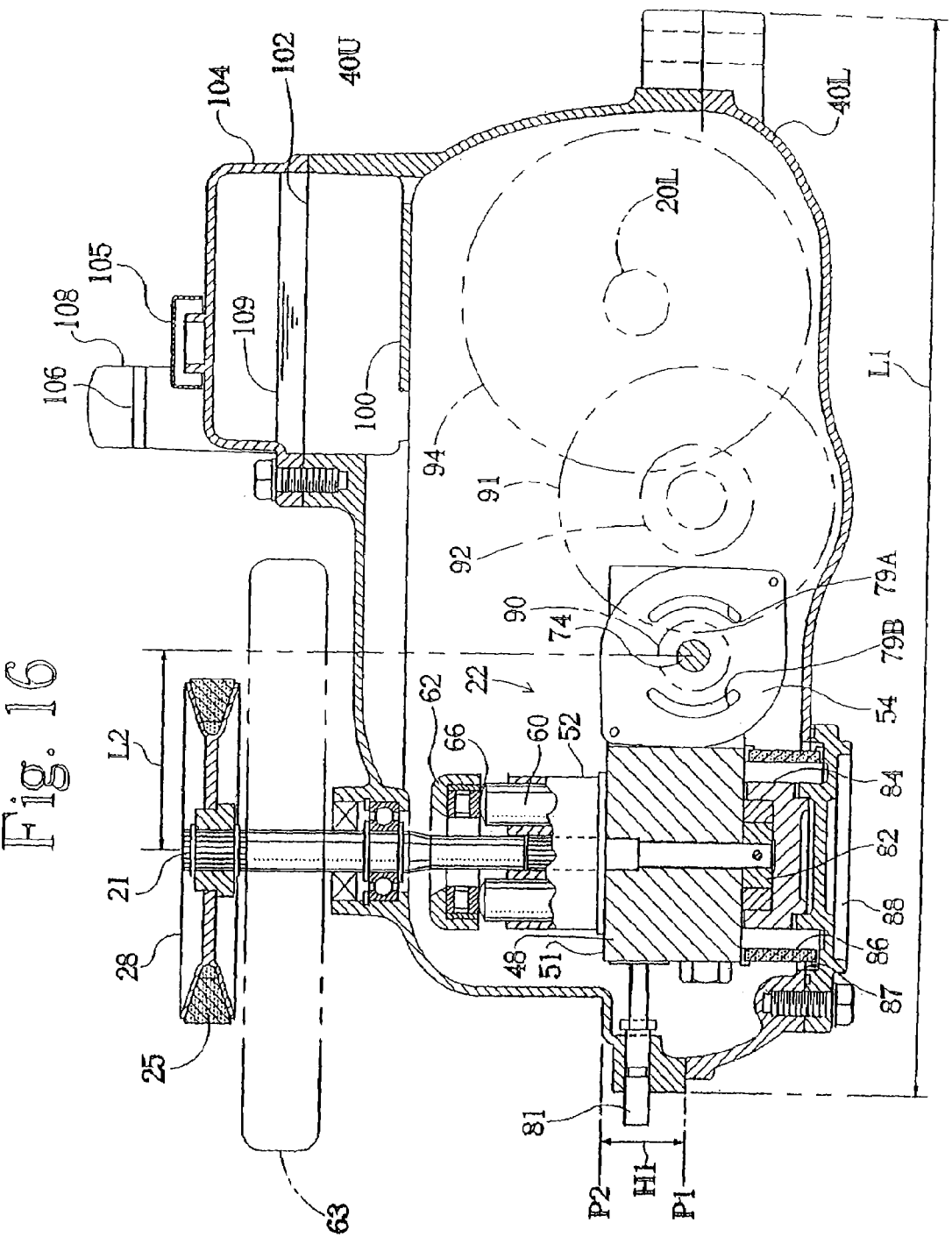
FIG. 16 illustrates a side elevation view, in section at G-G in FIG. 13, of an axle driving unit of the second embodiment of the present invention.
Figure 17:
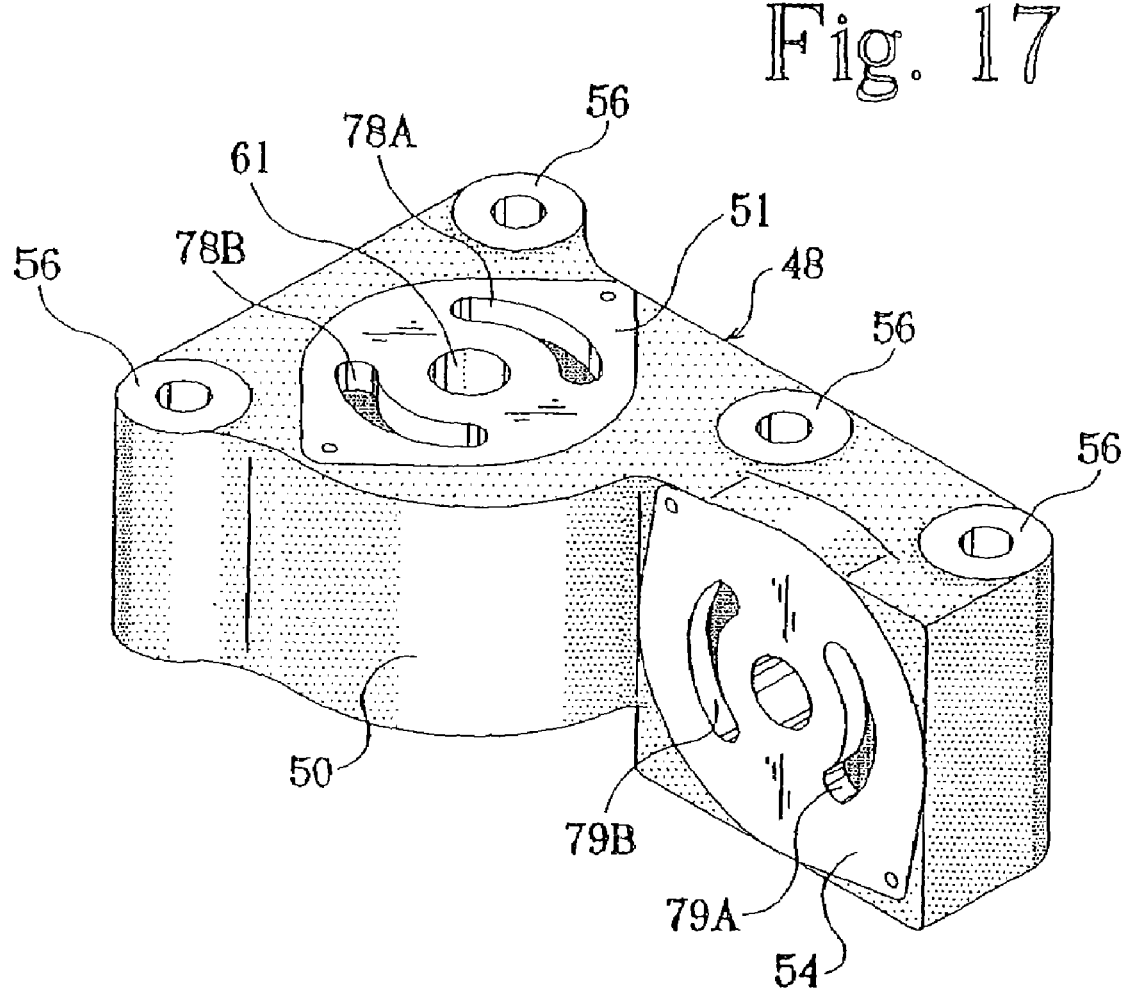
FIG. 17 illustrates a perspective view of a center section of the second embodiment of the present invention.

In FIGS. 11 and 12, the right side axle driving unit 18R is shown. As indicated above, the left and right side axle driving units 18R and 18L are substantially identical in the preferred embodiment except for the disposition of the operatively associated axle. Therefore, components and features of the unit 18R which are common to the unit 18L discussed above will be referenced by common reference numerals.

As illustrated, in the right side axle driving unit 18R, the axle 20R projects from the right side of the housing, and drive wheel 12R mounts at the distal end of the right axle 20R. In order to rotatably support the axle 20R in the housing 40, the axle driving unit 18R is provided with a third bearing support 110 including a hollow tube portion 113 defining a bearing seat for receiving the first roller bearing 44. The first roller bearing 44 rotatably supports the axle 20R proximate the point at which the axle projects from the housing 40. In the illustrated embodiment, the third bearing support 110 is provided in the upper half housing 40U, but it is contemplated that the roller bearing support 110 can be cooperatively defined by the upper and lower half housings 40U and 40L where the joint surface between the upper and lower half housings is alternatively disposed in a common plane with the rotational axis of the axle 20R, or can be provided in the lower half housing 40L where the joint surface is disposed in a plane above the rotational axis of the axle 20R. A fourth bearing support 111 is also provided which defines a bearing seat for receiving the second roller bearing 46. As illustrated, the second roller bearing 46 supports the proximal end of the axle 20R. In the preferred embodiment, the fourth bearing support 111 comprises a first component 111A provided on the upper half housing 40U, and a second component 111B provided on the lower half housing 40L such that the component 111A and 111B cooperatively define the bearing seat for receiving the second roller bearing 46 (See FIG. 12).

As FIGS. 5, 8, 11 and 12 illustrate, in the preferred embodiment of the present invention the housing 40 is constructed so as to integrally provide the first and second bearing supports 42 and 45 necessary for the mounting of the left axle 20L and the third and fourth bearing supports 110 and 111 necessary for mounting the right axle 20R. Depending upon whether the housing 40 is to be used for a left side axle driving unit 18L or a right side axle driving unit 18R, either partitioning wall portion 112L or 112R is removed to accommodate the axle 20L or 20R. Alternatively, the housing 40 can be manufactured without the partitioning wall portions 112L and 112R, and a separate seal member can be used to seal the unused opening in the housing 40.

In light of the above, it will be appreciated that the axle driving apparatus of the present invention provides an axle driving unit which can be used as either the left or right side axle driving unit without substantial modifications to either the housing 40 or the internal components of the units. This advantageous construction obviates the need to construct dedicated left and right side housings, thereby greatly decreasing manufacturing costs. Moreover, the advantageous placement and construction of the center section 48, allows the housing 40 to be greatly reduced in height and width when compared to conventional axle driving units. Accordingly, the axle driving apparatus can be used on small mowers or other small vehicles, and allows the vehicles to define lower centers of gravity so as to improve roadability.

In FIGS. 13-17, an alternate embodiment of the axle driving units of the present invention is illustrated. This second embodiment is similar in construction to the first embodiment described above so that the same parts are designated with the same reference numerals and the description of common features and components is omitted. Accordingly, only two points of different construction will be described. Further, in FIGS. 13-17 only the left axle drive unit 18L is illustrated, but it will be understood that in the preferred embodiment the right axle drive unit 18R is substantially identical to the drive unit 18L except for the disposition of the operatively associated axle.

With respect to the first difference in construction, in many small mower and small vehicle applications it is advantageous for the axle drive units 18L and 18R to be as narrow in width as possible since available mounting space on the body frame may be limited. Therefore, in the second embodiment the enlarged region of the housing 40 is elongated, and the configuration of the center section 48 defines an alternative configuration which is efficiently accommodated in the modified enlarged region. In this regard, the pump mounting face 51 and motor mounting surface 54, formed on upper surface 49 and side surface 50, respectively, are formed so that motor mounting surface 54 laterally overlaps pump mounting surface 51 by a length L2. Thus, the length L2 from input shaft 21 to motor shaft 74 is larger in this embodiment (see FIG. 16) than in the first embodiment (see FIG. 9) and the cylinder block 59 of the hydraulic pump is disposed further away from the axle 20L than in the first embodiment. As a result of this alternative construction, the center section 48 can be contained in a narrower enlarged region having a width W2 (see FIG. 13) thereby consuming less lateral space within the body frame 11.

It will also be noted that the housing 40 of this second embodiment is preferably provided with a further mounting boss 41C at the utmost end of the enlarged region of the housing. Mounting boss 41C is connected to a further mounting member 19F provided on the body frame 11 (E.g. see FIGS. 27 and 29). Given the increased length L1 of the housing of the second embodiment, this further mounting boss 41C facilitates the stable mounting of the axle driving unit on the body frame 11.

A second difference is with respect to the motor shaft 74. As in the first embodiment, brake friction plate 95 is disposed on one end of the motor shaft 74 that extends outwardly from the housing. The difference in this embodiment is that the other end of motor shaft 74 is provided with a spline, and it extends into a through-open bore provided at the center of motor mounting surface 54. A bushing 117 is interposed between the joint surfaces of the housing to support a rotary shaft 114 (see FIG. 13). The spline end of motor shaft 74 is spline-engaged with one end of the rotary shaft 114 so that the driving force of motor shaft 74 is taken out of the housing through rotary shaft 114.

In the preferred embodiment, the outer end of rotary shaft 114 is an indented spline. The braking friction plate 95 can be mounted on this end of the rotary shaft 114, or the rotary shaft 114 can be used as a power take-out shaft. If such construction is not required, rotary shaft 114 can be removed and the bore formed at the joint surfaces of the housing can be closed by a seal cap.

Figure 18:
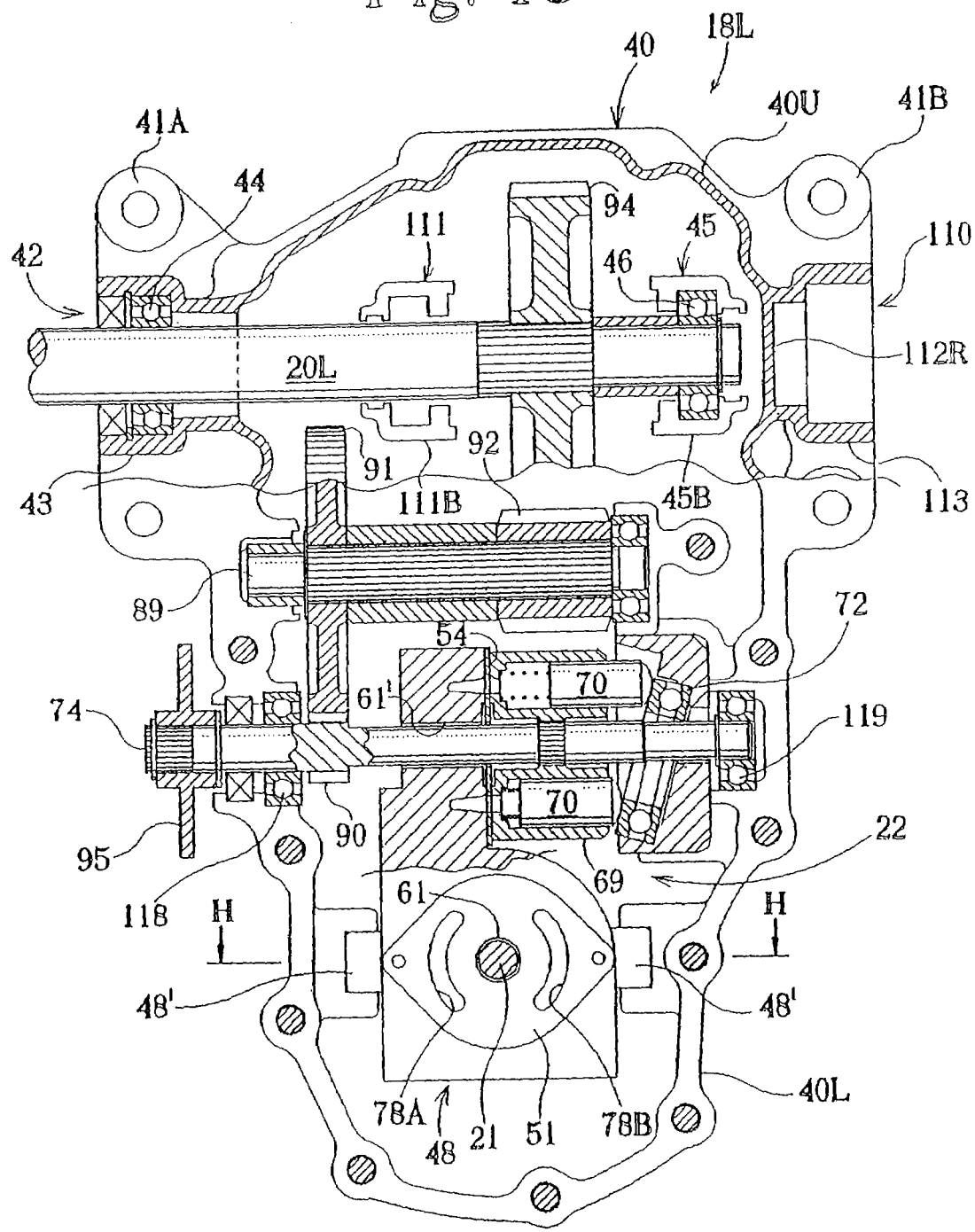
FIG. 18 illustrates a plan view, partially in section, of an axle driving unit of a third embodiment of the present invention.
Figure 19:
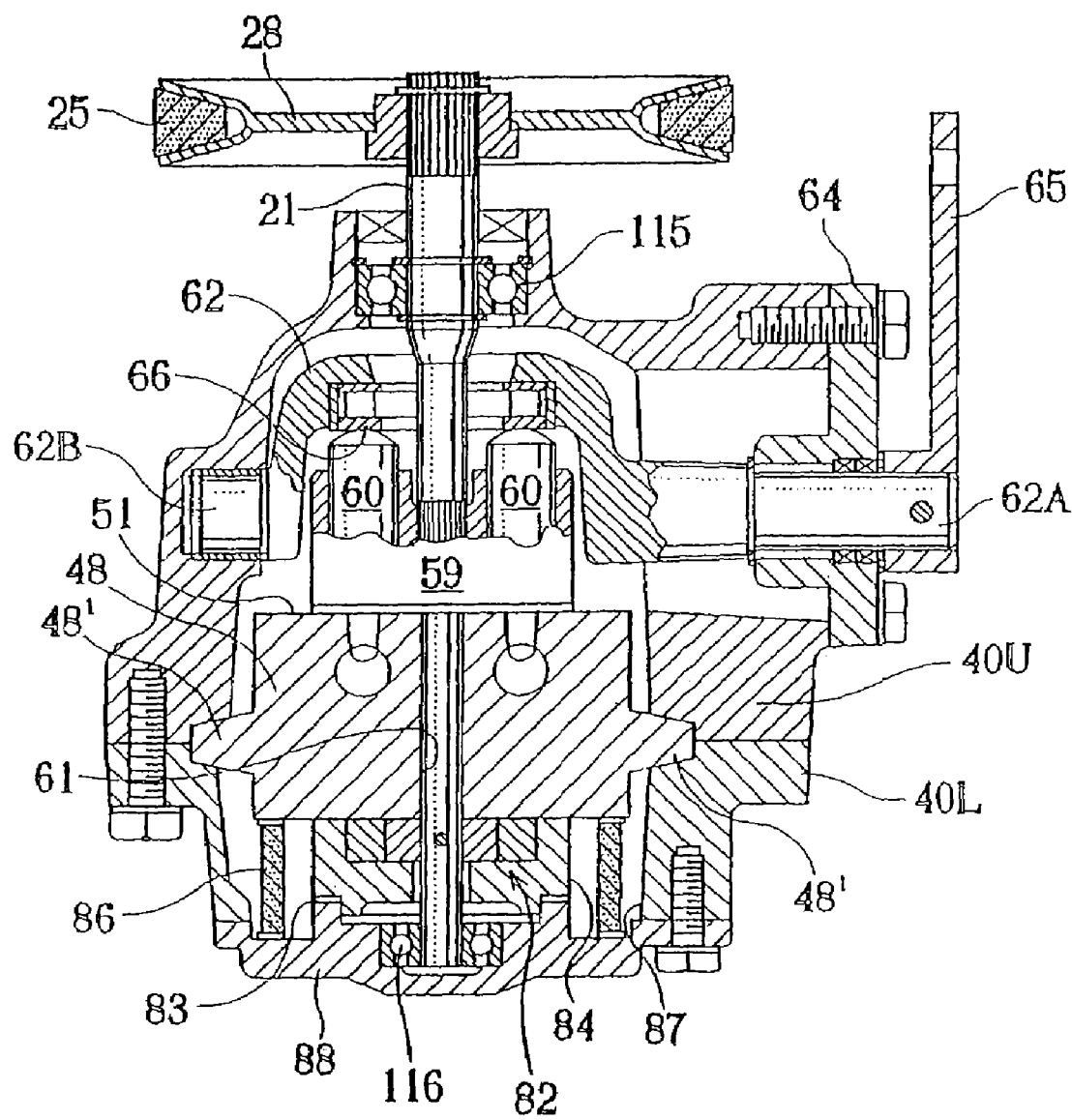
FIG. 19 illustrates a front elevation view, in section at H-H in FIG. 18, of an axle driving unit of the third embodiment of the present invention.
Figure 20:
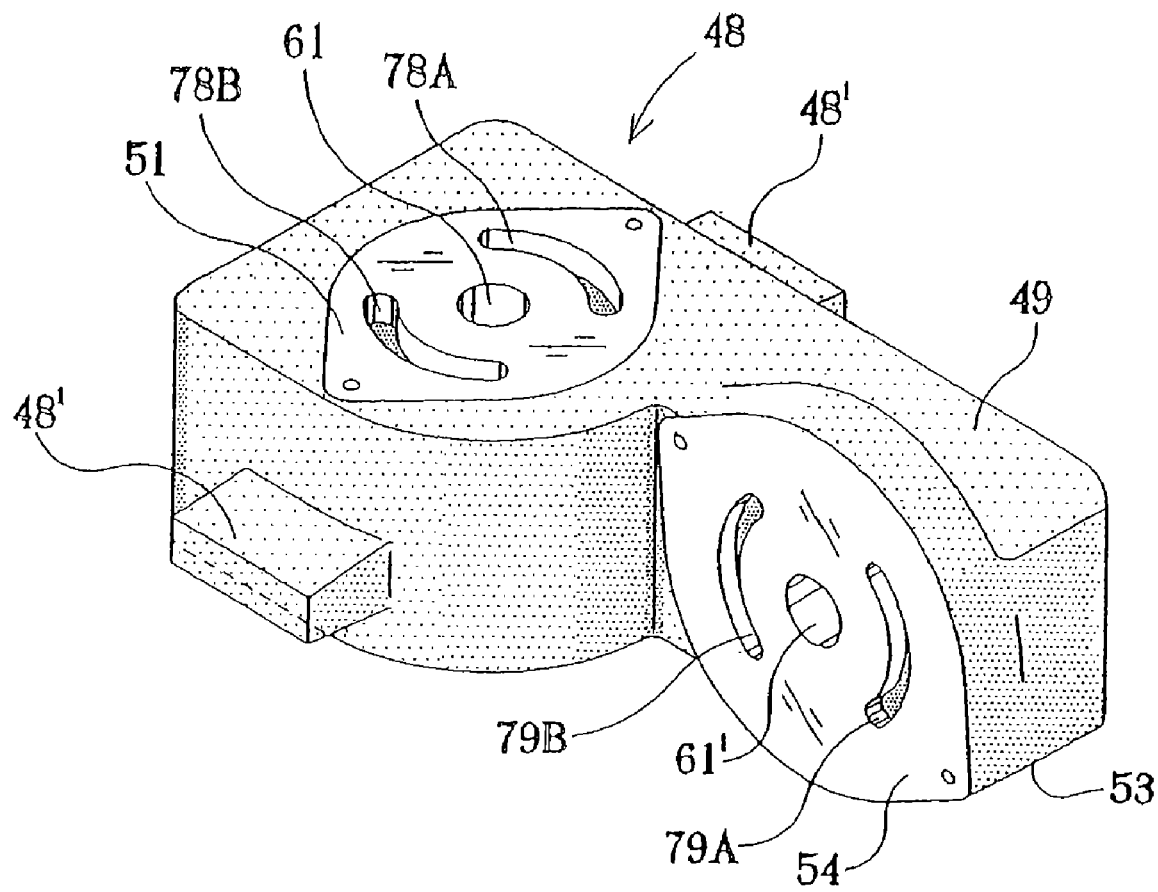
FIG. 20 illustrates a perspective view of a center section of the third embodiment of the present invention.

A third embodiment of the axle driving units of the present invention is illustrated in FIGS. 18-20. It will be noted that the construction of this third embodiment is similar to that of the second embodiment described above. However, in the third embodiment, the center section 48 is not connected to upper half housing 40U by bolts, but inserted in part between upper half housing 40U and lower half housing 40L. Therefore, center section 48 is positioned in the enlarged region in a free-standing state. In this regard, housing mounting faces 48 project from the left and right side surfaces of center section 48. Further, the upper surface 49 of the center section 48 and the lower surface 53 opposite thereto form housing mounting faces. Since the center section 48 is free-standing, bolts are not required such that assembly is simplified and manufacturing cost is lowered.

In order for center section 48 of the third embodiment to be free-standing, input shaft 21 and motor shaft 74 are completely supported by the housing 40. Upper end of input shaft 21 is supported by a bearing 115 attached to the upper half housing 40U, and the lower end of the input shaft 21 passes through the bore 61 in center section 48 and is supported by a bearing 116 mounted in the lid 88 of the lower half housing 40L (see FIG. 19). Motor shaft 74 passes through a bore 61 in the center section 48 and the opposite ends are supported by bearings 118 and 119 (see FIG. 18).

Figure 21:
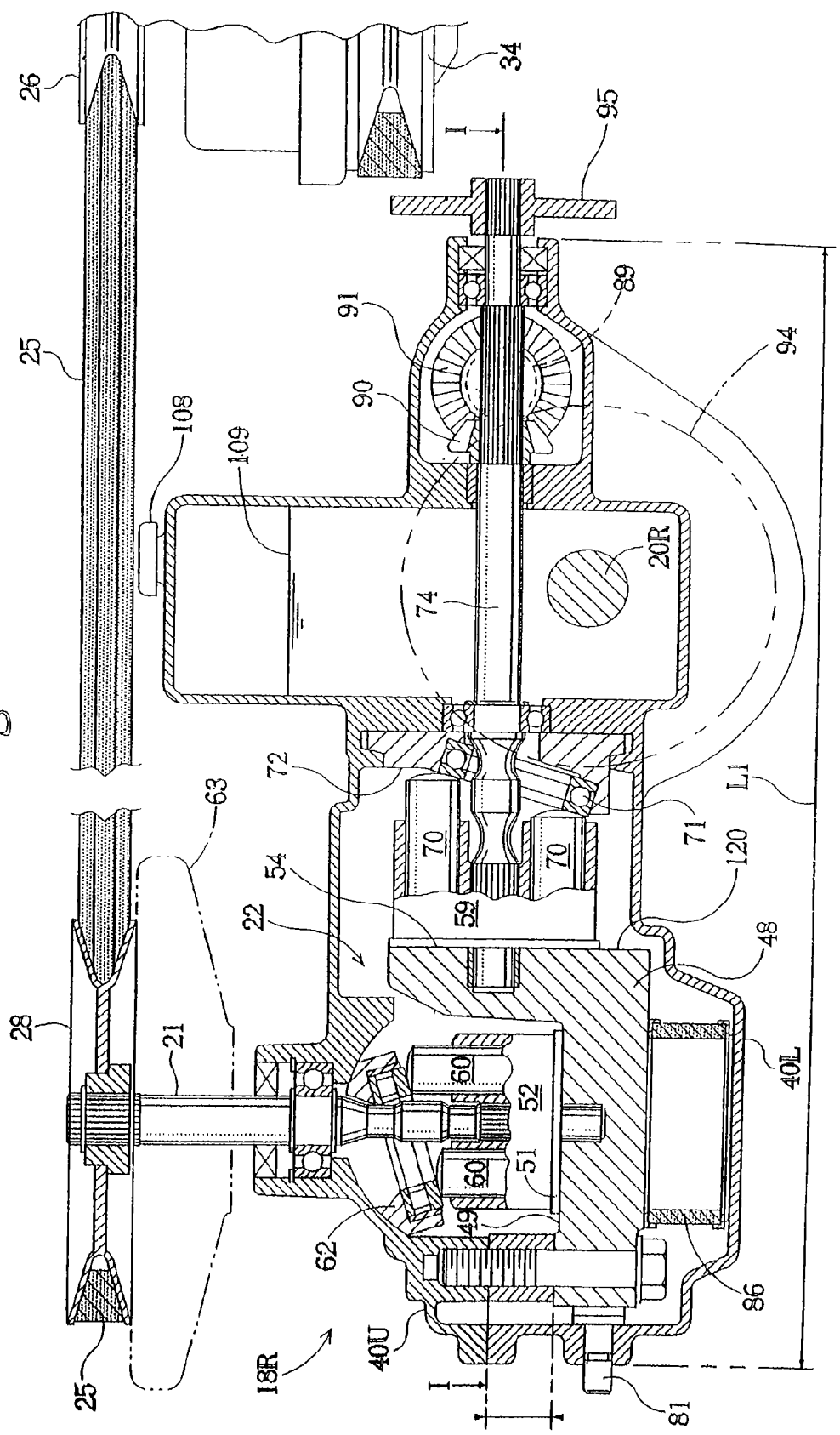
FIG. 21 illustrates a side elevation view, in section, of an axle driving unit of a fourth embodiment of the present invention.
Figure 22:
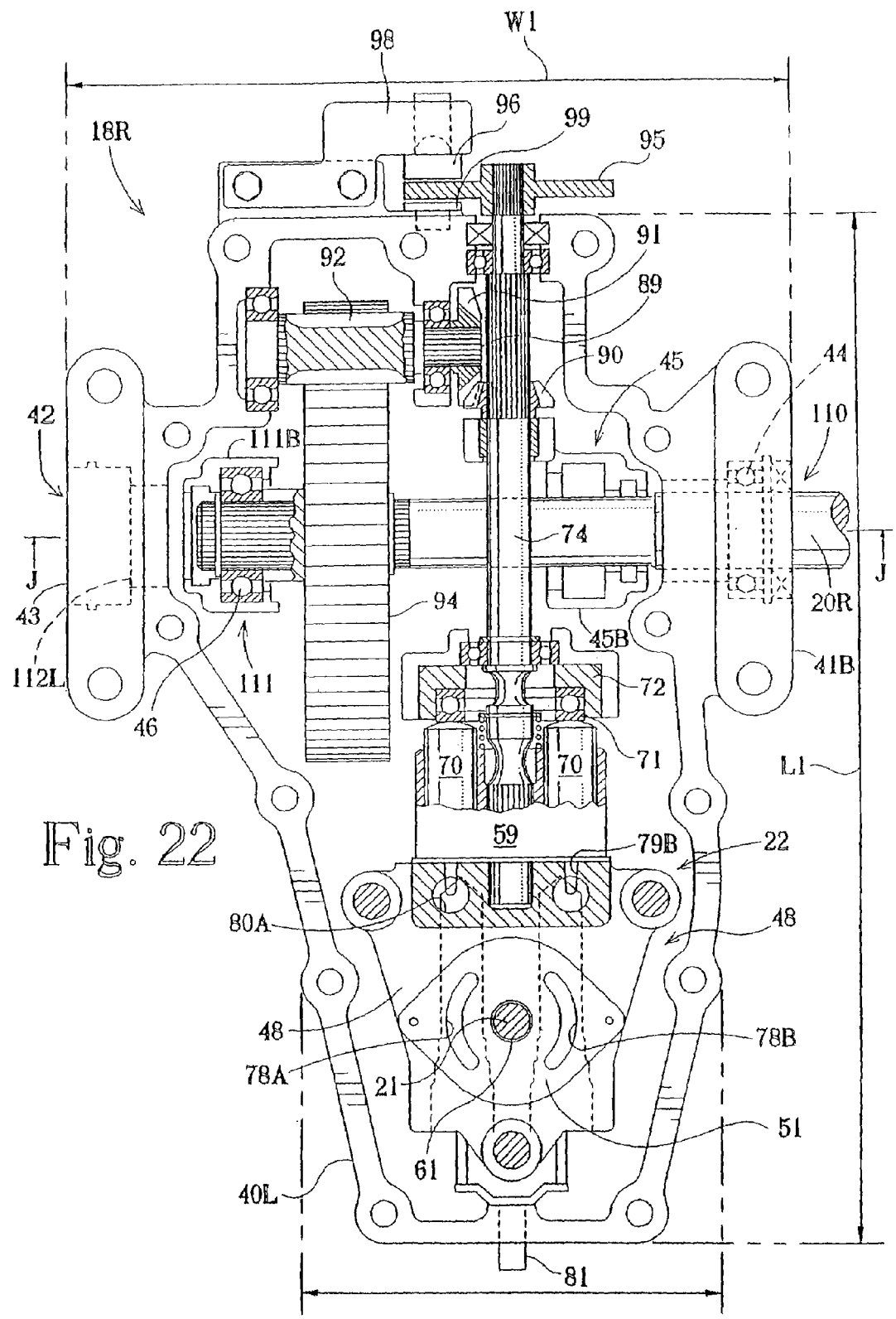
FIG. 22 illustrates a plan view, partially in section, taken at I-I in FIG. 21, of an axle driving unit of the fourth embodiment of the present invention.
Figure 23:
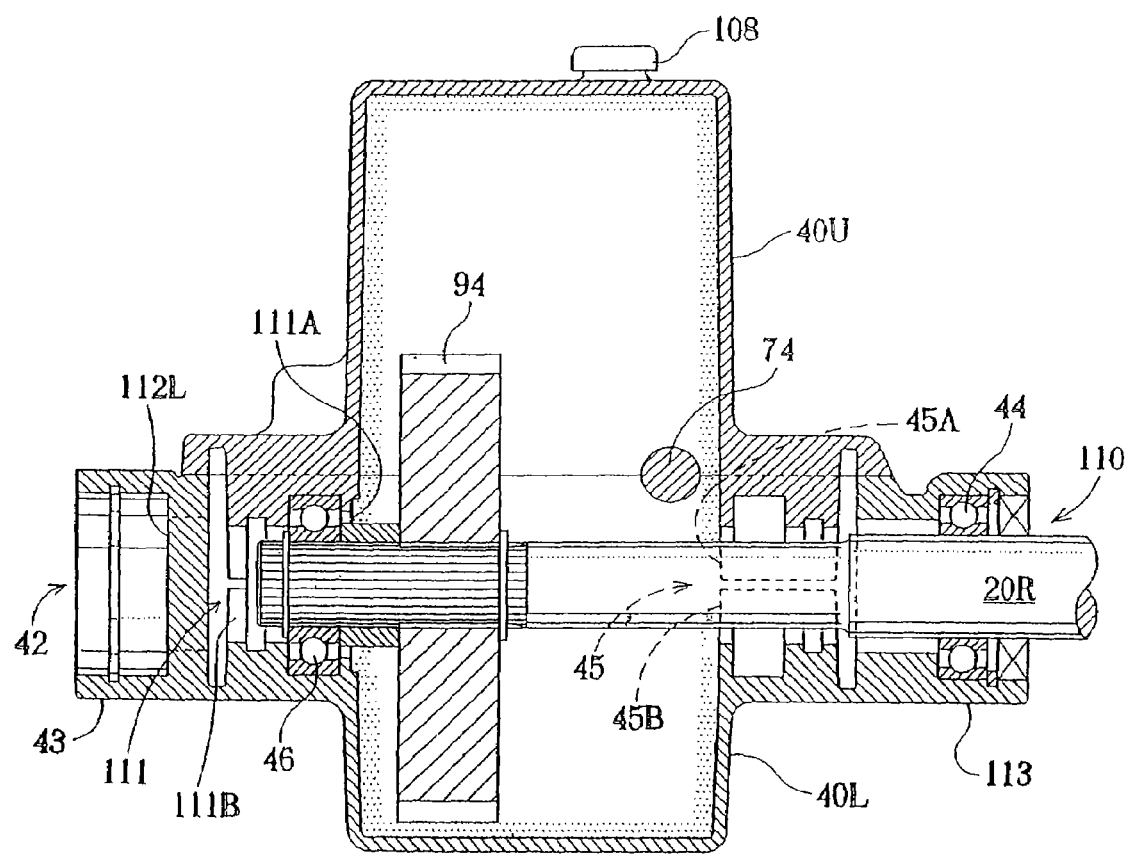
FIG. 23 illustrates a rear elevation view, in section taken at J-J in FIG. 22, of an axle driving unit of the fourth embodiment of the present invention.

In FIGS. 21-23, a fourth embodiment of the axle driving units of the present invention is illustrated. In this embodiment a center section 48 of substantially L-like shape in sectional side view is disposed in an elongated enlarged region extending across upper half housing 40U and lower half housing 40L, and is fixed to upper half housing 40U. The pump mounting surface 51 is formed on a substantially horizontal upper surface 49, and the motor mounting surface 54 is formed on a substantially vertical end surface 120 of center section 48. Pump mounting surface 51 is positioned apart from axle 20R, and motor mounting surface 54 is positioned near the axle. The input shaft 21 extends substantially vertically and substantially perpendicular to the axle 20R, and motor shaft 74 extends substantially horizontally and substantially perpendicular to axle 20R. It will also be recognized by those skilled in the art that in this fourth embodiment, the movable swash plate 62 is a cradle-type rather than the trunnion-type swash plate of the above-described embodiments. However, it will be understood that cradle-type and trunnion-type swash plates can be interchangeably used in any of the embodiments discussed herein.

In the fourth embodiment, an oil filter 86 is interposed between the lower surface of center section 48, opposite to the pump mounting surface 51, and the inner surface of the bottom wall of lower half housing 40L. Oil in the housing 40 is filtered by the oil filter 86 and guided to a supply point (not shown) open at the lower surface of center section 48.

Preferably, the axis of the motor shaft 74 of the fourth embodiment is positioned in the same plane as the joint surface of the housing such that the motor shaft 74 is rotatably supported by bearings interposed between the upper half housing 40U and the lower half housing 40L. Further, unlike earlier described embodiments, the axle 20R is disposed in the lower half housing 40L. Motor shaft 74 is substantially rectangular to the axle 20R, and passes above the axle 20R. The utmost end of the motor shaft 74 projects from the housing, and a brake friction plate 95 is mounted the thereon.

As best illustrated in FIG. 22, the counter shaft 89 extends parallel to the axle 20R and is substantially perpendicular to the motor shaft 74. Preferably the counter shaft 89 is positioned in the same plane as the joint surface of the housing such that it can be rotatably supported by bearings sandwiched between the upper half housing 40U and the lower half housing 40L. Since the motor shaft 74 and the counter shaft 89 are substantially perpendicular to each other, the gear 90 mounted on the motor shaft 74 and the gear 91 of the counter shaft 89 comprise bevel gears. Accordingly, driving force is transmitted from the motor shaft 74 to the counter shaft 89 by bevel gears 90 and 91, and driving force is transmitted from the counter shaft 89 to the axle 20R through gears 92 and 94.

A fifth embodiment of the axle driving units of the present invention is illustrated in FIGS. 24-28. In this embodiment, the center section 48 is disposed in the elongated enlarged region of the housing in a substantially horizontal orientation. Both the pump mounting surface 51 and the motor mounting surface 54 are formed on the upper surface 49 of the center section 48 with the motor mounting surface 54 being disposed nearest to the axle 20L. The input shaft 21 and motor shaft 74 extend in parallel to each other, and are substantially vertically disposed and at substantially right angles to the axle 20L. It will be recognized that in embodiments where the motor shaft 74 is horizontally oriented, the width of the housing is dictated in large part by the need to accommodate the length of the motor shaft 74. Thus, by reorienting the motor shaft 74 from a horizontal position to a vertical position the housing 40 can be made narrower.

It will be noted that the input shaft 21 is rotatably mounted in essentially the same manner as in the first embodiment. However, the movable swash plate 62 of the fifth embodiment is of a cradle-type, and is manually controllable along the concave circular-arc surface of the inner wall of the upper half housing 40U by using a conventional operating mechanism.

With respect to the motor shaft 74 of the fifth embodiment, the upper end of the shaft 74 extends through the fixed swash plate 72 of the hydraulic motor 55, with the fixed swash plate 72 being fixedly fitted into a concave formed at the inner wall of the upper half housing 40U. The upper end of the motor shaft 74 is rotatably supported by the bearing 75, and projects through the upper half housing 40U. The projecting end of the motor shaft 74 carries the braking friction plate 95, which rides on a spring member 97. Thus, the braking mechanism is mounted on the top of the housing 40 rather than the side, thereby allowing the axle driving unit to be reduced in width. Further, it will be noted that the braking friction plate 95 is positioned in the proximity of the cooling fan 63, and ventilation from the cooling fan 63 serves to blow away the dust collected on the braking friction plate 95.

The lower end of the shaft 74 projects through a bore 121 provided in the center section 48 and the motor shaft is rotatably supported in the bore 121 by a bushing 122. In this regard, in the preferred embodiment the center section is disposed at substantially mid-level along the vertical dimension of the enlarged region of the housing, and the counter shaft 89, which is substantially parallel to the axle 20L, is disposed below the center section 48. The lower end of the motor shaft 74 which projects through the center section 48 carries the gear 90 which imparts driving force to the counter shaft 89, with such gear 90 defining a bevel gear in this embodiment.

In the fifth embodiment illustrated in FIGS. 24-28, one end of the counter shaft 89 is rotatably supported by a bearing 124 which is sandwiched between the upper and lower half housings 40U and 40L, respectively. The other end of the counter shaft 89 is cooperatively supported by a projection 123 provided on the lower half housing 40L and a leg member 125 which extends downwardly from the bottom surface of the center section 48. More specifically, the projection 123 to of the lower half housing 40L defines a semicircular recess 126, and the lower surface of the leg member 125 defines a further semicircular recess 128, such that the recesses 126 and 128 cooperatively define a receptor for receiving a bushing 129 which, in turn, rotatably supports the end of the counter shaft 89. In the preferred illustrated embodiment, the center section 48 and leg member 125 define separate components with a split pin 130 being provide to maintain the desired relative disposition of the center section 48 and leg member 125. However, it will be recognized that the leg member 125 can be integrally formed with the center section 48.

Figure 24:
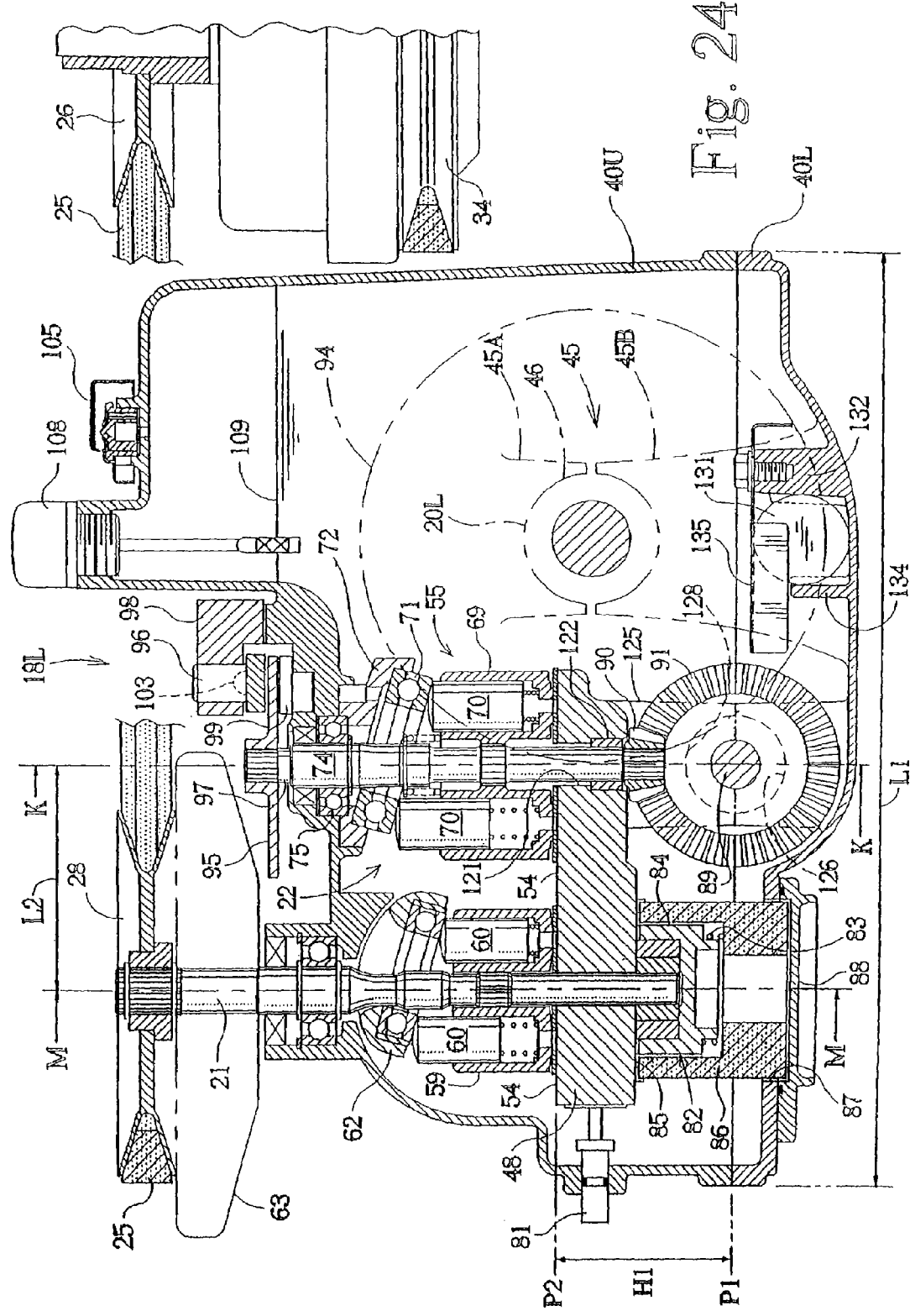
FIG. 24 illustrates a side elevation view, in section, of an axle driving unit of a fifth embodiment of the present invention.
Figure 25:
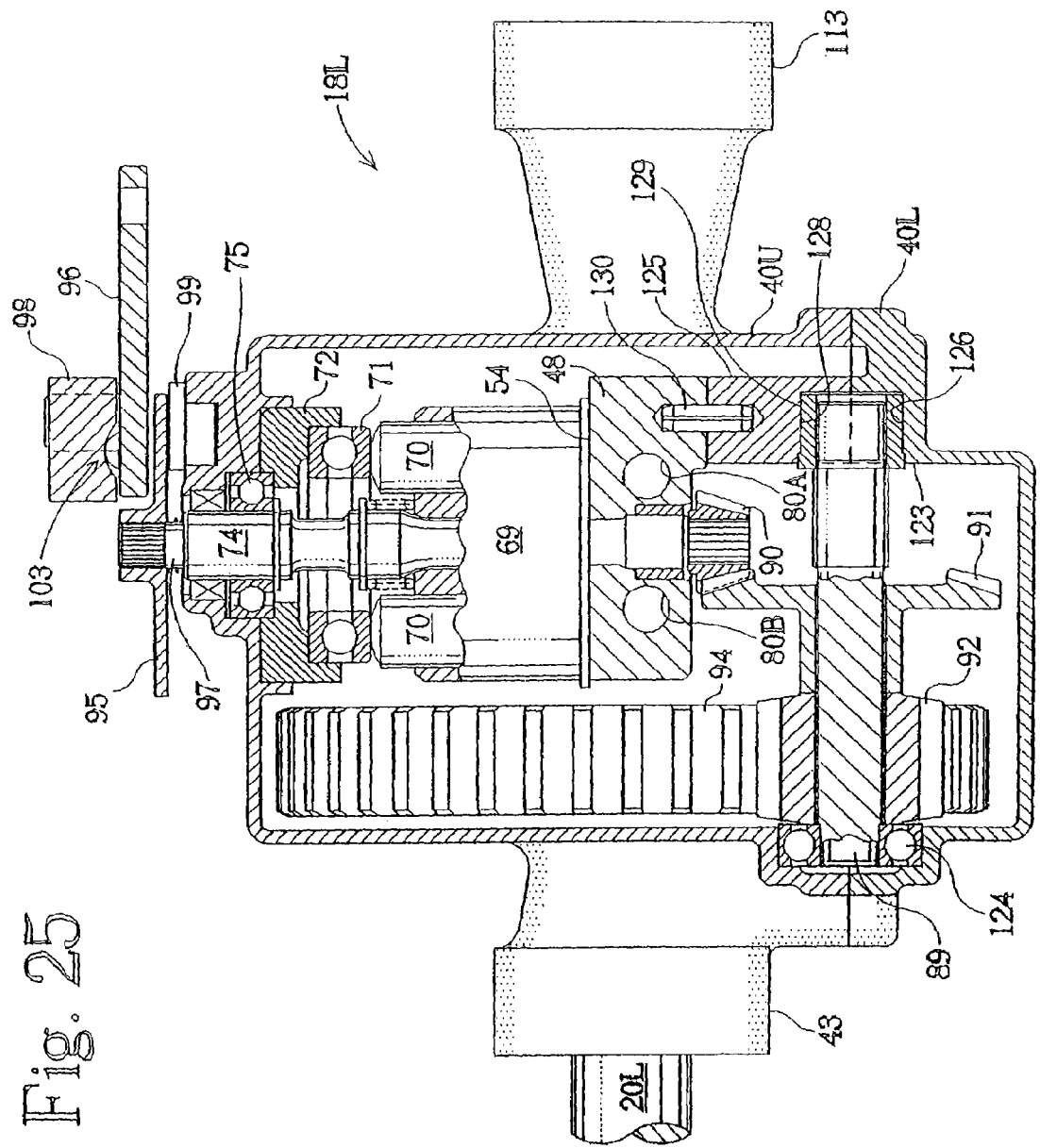
FIG. 25 illustrates a rear elevation view, in section taken at K-K in FIG. 24, of an axle driving unit of the fifth embodiment of the present invention.
Figure 26:
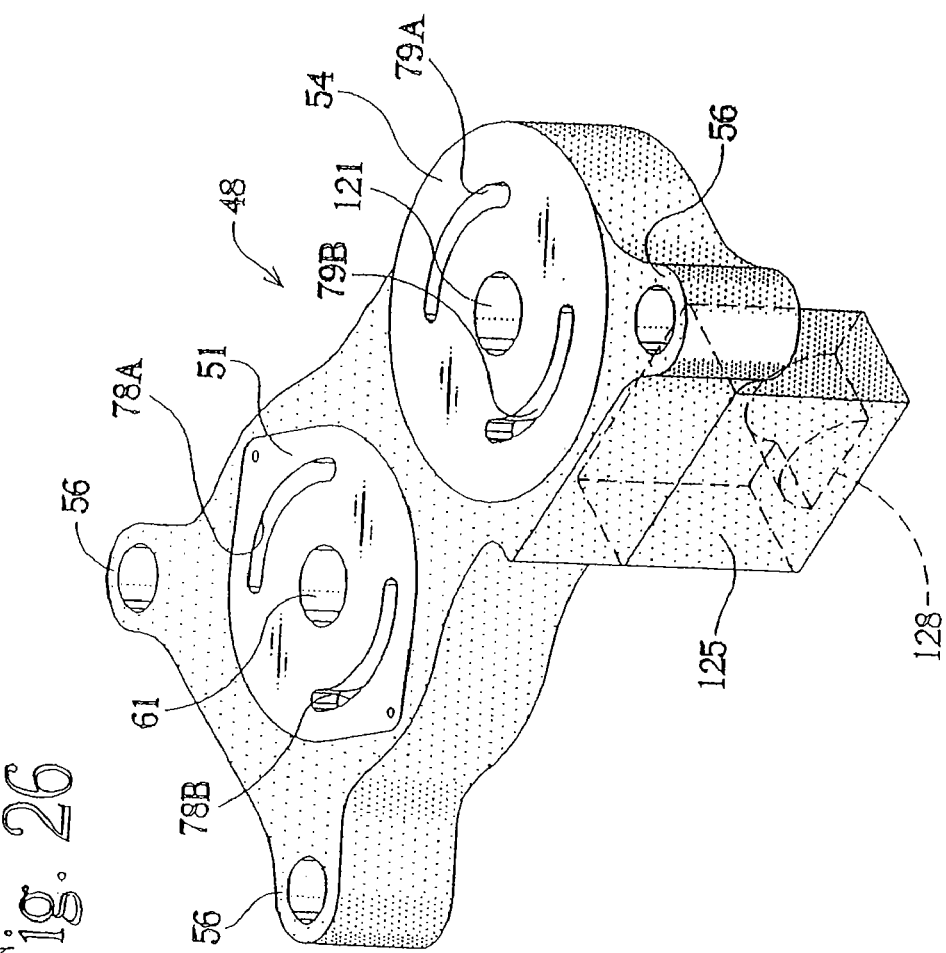
FIG. 26 illustrates a perspective view of the center section of the fifth embodiment of the present invention.

As illustrated in FIG. 24, the fifth embodiment is provided with a mechanism for removing iron powder and metal fragments from the oil within the housing 40. In the illustrated embodiment, this mechanism includes a magnet 131 which is disposed between two partitions 132 and 134 provided on the inside wall of the lower half housing 40L. A metal plate member 135 is secured to the partition 132 so as to engage and secure the magnet 131 in position, the plate member 135 providing a substantial magnet bonding surface for accumulating iron power and other metallic particulates.

Figure 28:
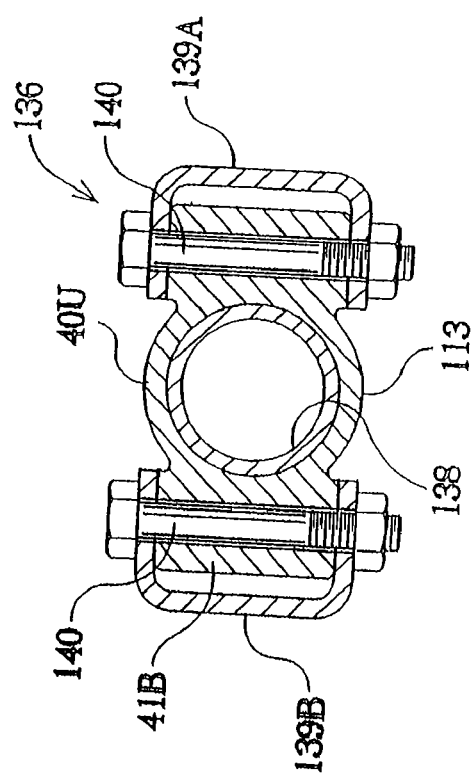
FIG. 28 illustrates a side elevation view, in section taken at L-L of FIG. 27, of an axle driving apparatus of tie fifth embodiment of the present invention.
Figure 27:
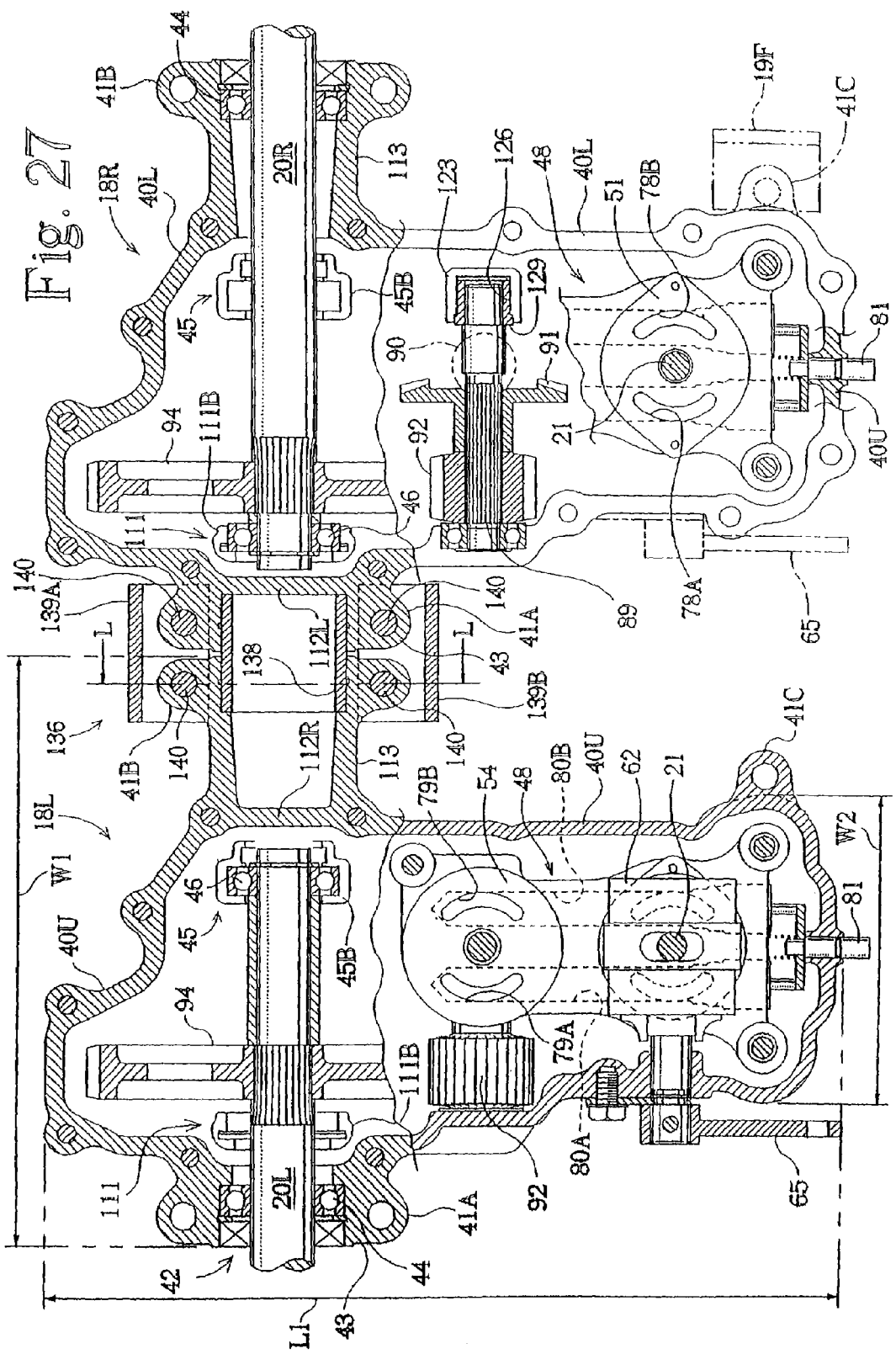
FIG. 27 illustrates a plan view, partially in section, of an axle driving apparatus of the fifth embodiment of the present invention.

Whereas the axle driving units 18L and 18R define separate housings 40, and can be separately mounted on the body frame 11, it is advantageous for the axle driving units 18L and 18R to be secured together to insure the stable mounting of the axle driving apparatus as a whole, and to insure the proper alignment of the axles 20L and 20R. Accordingly, as illustrated in FIGS. 27 and 28, the fifth embodiment of the present invention is provided with a coupling mechanism referenced generally at 136 for securing the housings of the axle driving units 18L and 18R together.

In the preferred embodiment, the coupling mechanism 136 includes a dowel member 138, the opposite ends of which are closely received in the unused third bearing support 110 of the axle driving unit 18L and the unused first bearing support 42 of the axle driving unit 18R. It will be recognized that this dowel member 138, which in the preferred illustrated embodiment defines a length of pipe, serves to maintain the positions of the units 18L and 18R such that the axles 20L and 20R are aligned on a common rotational axis. The coupling mechanism 136 also includes a pair of C-shaped coupling brackets 139A and 139B which engage and extend between the mounting bosses 41A and 41B on either side of the beating supports 110 and 42. Holes are provided in the upper flange of the coupling brackets 139A and 139B which register with the mounting bores provided in the mounting bosses 41A and 411B, and which register with operatively associated holes provided in the lower flange of the coupling brackets 139A and 139B. Accordingly, to secure the coupling brackets in place, bolts 140 are inserted through the holes in the upper flange of the coupling brackets 139A and 139B, through the mounting bores of the mounting bosses and holes of the lower flange of the coupling bracket, and secured in place.

It will be recognized that the coupling mechanism 136 can be used with any of the illustrated embodiments of the present invention. Further, the illustrated coupling mechanism 136 is merely illustrative of one suitable mechanism for securing the units 18L and 18R together and it is contemplated that other mechanism can be interchangeably used.

Figure 29:
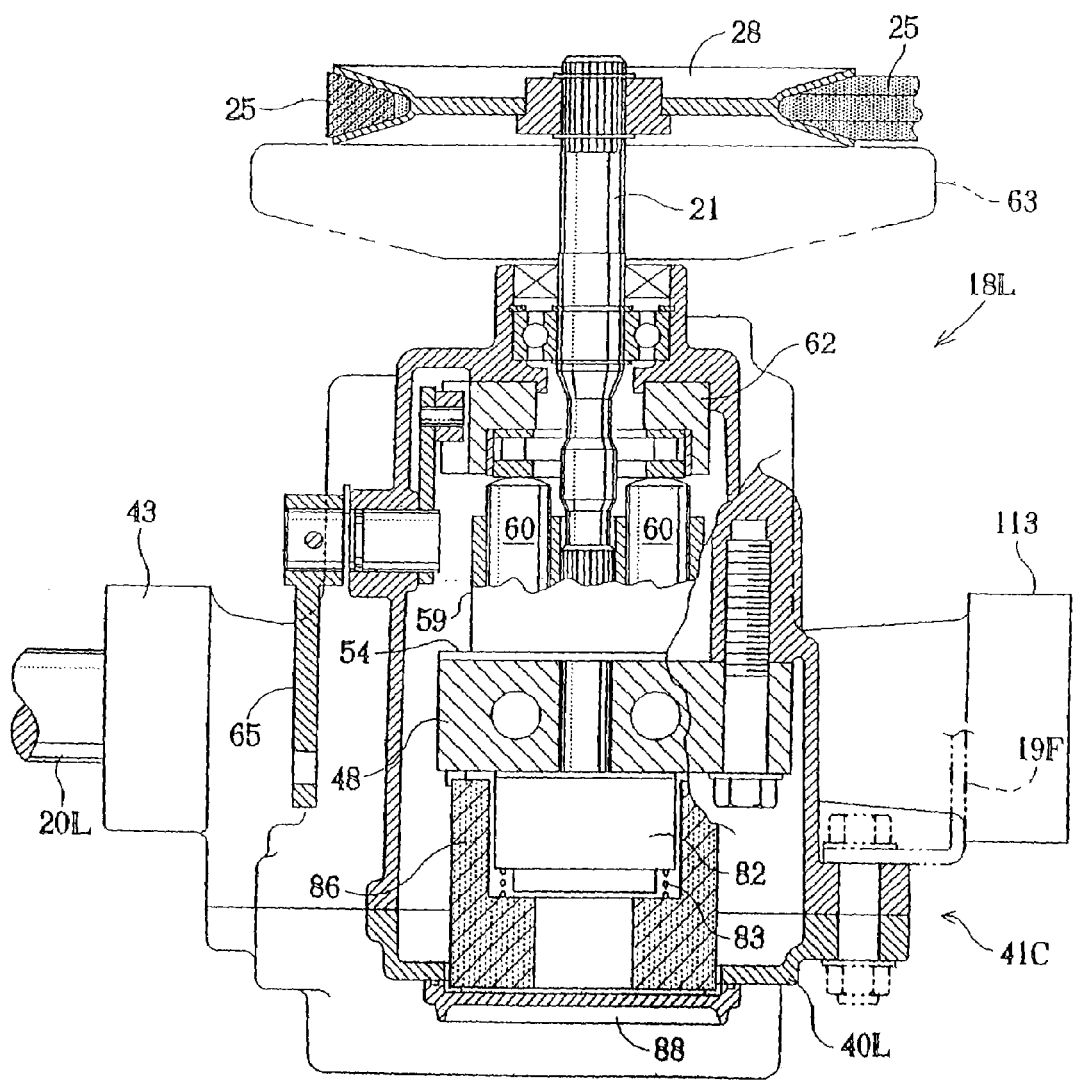
FIG. 29 illustrates a rear elevation view, in section taken at M-M of FIG. 24, of an axle driving apparatus of the fifth embodiment of the present invention.
Figure 30:
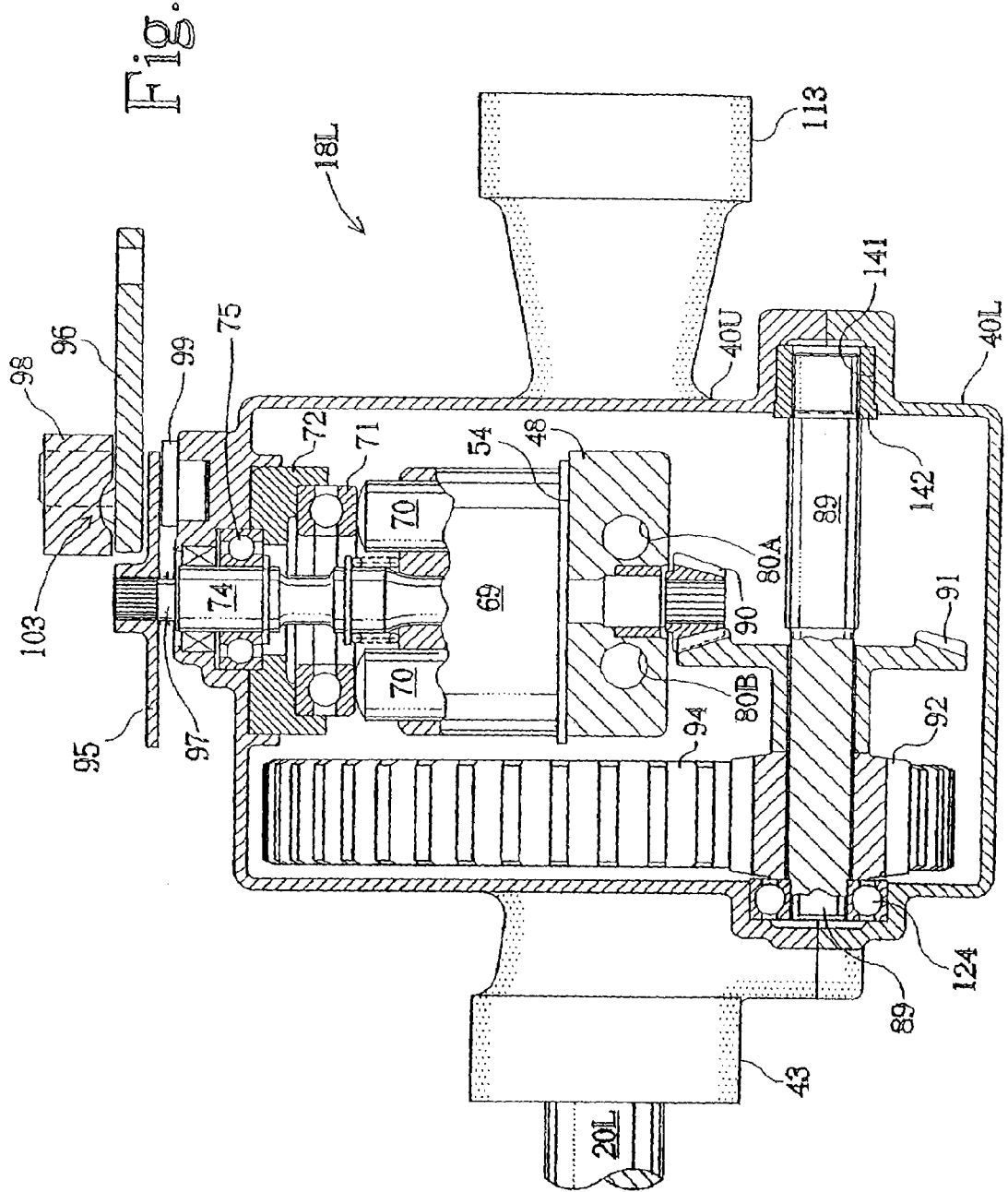
FIG. 30 illustrates a rear elevation view, in section, of an axle driving unit of a sixth embodiment of the present invention.
Figure 31:
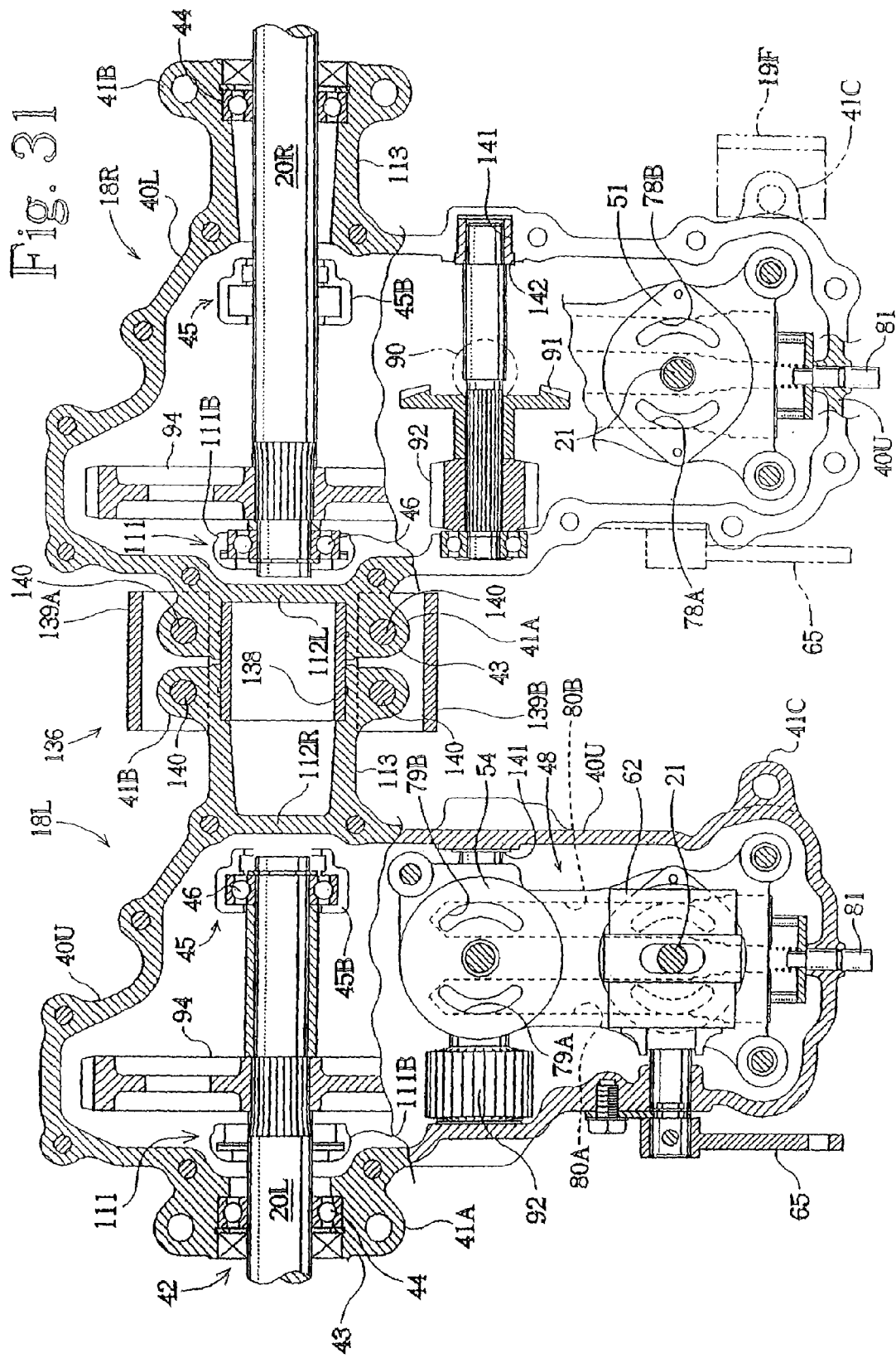
FIG. 31 illustrates a plan view, partially in section, of an axle driving apparatus of the sixth embodiment of the present invention.

In FIGS. 29-31, a sixth embodiment of the axle driving units of the present invention is illustrated. In this regard, the axle driving units 18L and 18R of the sixth embodiment are similar in construction to the units 18L and 18R of the fifth embodiment. However, in the sixth embodiment no leg member 125 is provided, and instead, the upper half housing 40U and the lower half housing 40L cooperatively define a receptor 141 oil which is mounted a bushing 142 which rotatably supports the end of the counter shaft 89.

In light of the above, it will be recognized that the present invention provides an axle driving apparatus having great advantages over the prior art. The apparatus can be mounted on a relatively small body frame, and includes an axle driving unit which call alternatively be used as either a left side or a right side axle driving unit by simply changing the disposition of the operatively associated axle. Moreover, the apparatus is drivingly connected to the prime mower of a vehicle by a single driving belt, and allows the vehicle on which it is mounted to define a low center of gravity to improve roadability. However, while a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A pair of integrated hydrostatic transaxles for independently driving right and left wheels of a vehicle, each integrated hydrostatic transaxle comprising:
    a housing;
    a single axle supported by the housing and selectively extending outwardly from one side or another side of the housing;
    a hydrostatic transmission disposed within the housing and drivingly coupled to the axle, the hydrostatic transmission including a hydraulic pump having a pump shaft and a hydraulic motor having a motor shaft with a rotatable cylinder block; and
    a brake mechanism coupled to the axle;
    wherein the pump is a variable displacement type, having a control shaft supported by the housing parallel to the motor shaft, the control shaft is disposed above the pump mounting surface and extending outwardly from either side of the housing,
    wherein the motor shaft has an end extending outwardly from either side of the housing.

2. A pair of integrated hydrostatic transaxles, as set forth in claim 1, wherein the brake mechanism is directly mounted on the motor shaft.

3. A pair of integrated hydrostatic transaxles, as set forth in claim 2, wherein the brake mechanism and the motor cylinder block are installed separately on the motor shaft.

4. A pair of integrated hydrostatic transaxles for independently driving right and left wheels of a vehicle, each integrated hydrostatic transaxle comprising:
    a housing;
    a single axle supported by the housing;
    a hydrostatic transmission disposed within the housing and drivingly coupled to the axle, the hydrostatic transmission including a hydraulic pump, a hydraulic motor, and a center section for separably mounting within the housing;
    the pump having a pump shaft with a rotatable cylinder block;
    the motor having a motor shaft with a rotatable cylinder block;
    the center section having a pump mounting surface for the cylinder block of the pump and a motor mounting surface for the cylinder block of the motor, wherein the pump mounting surface and the motor mounting surface are substantially perpendicular to each other; and
    a brake mechanism directly mounted on the motor shaft;
    wherein the pump is a variable displacement type, having a control shaft supported by the housing parallel to the motor shaft, the motor shaft is disposed below the pump mounting surface and the control shaft is disposed above the pump mounting surface.

5. A pair of integrated hydrostatic transaxles, as set forth in claim 4, wherein the brake mechanism and the motor cylinder block are installed separately on the motor shaft.

6. A pair of integrated hydrostatic transaxles, as set forth in claim 4, wherein the motor shaft has an end extending outwardly from one side of the housing.

7. A pair of integrated hydrostatic transaxles, as set forth in claim 6, wherein the control shaft extends outwardly from another side of the housing.

\* \* \* \* \*